(12) United States Patent
Yoshioka et al.

(10) Patent No.: US 8,342,143 B2
(45) Date of Patent: Jan. 1, 2013

(54) SPARK IGNITION TYPE INTERNAL COMBUSTION ENGINE

(75) Inventors: Mamoru Yoshioka, Susono (JP); Daisuke Akihisa, Susono (JP); Eiichi Kamiyama, Mishima (JP); Yukihiro Nakasaka, Suntou-Gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 217 days.

(21) Appl. No.: 12/674,846

(22) PCT Filed: Jan. 16, 2009

(86) PCT No.: PCT/JP2009/051014
§ 371 (c)(1),
(2), (4) Date: Apr. 14, 2010

(87) PCT Pub. No.: WO2009/091077
PCT Pub. Date: Jul. 23, 2009

(65) Prior Publication Data
US 2010/0294245 A1    Nov. 25, 2010

(30) Foreign Application Priority Data
Jan. 16, 2008 (JP) .................. 2008-006936

(51) Int. Cl.
*F02B 75/04* (2006.01)
*F01L 1/34* (2006.01)
(52) U.S. Cl. .............. 123/48 R; 123/78 R; 123/90.15; 701/113
(58) Field of Classification Search ....... 123/48 R–48 D, 123/78 R–78 F, 90.15–90.18; 701/113
See application file for complete search history.

(56) References Cited

U.S. PATENT DOCUMENTS
6,691,655 B2 * 2/2004 Aoyama et al. ............ 123/48 R
(Continued)

FOREIGN PATENT DOCUMENTS
DE    10 2004 005 751 A1    8/2004
(Continued)

OTHER PUBLICATIONS
International Search Report issued in International Application No. PCT/JP2009/051014 on Mar. 17, 2009 (with English-language translation).

*Primary Examiner* — Noah Kamen
(74) *Attorney, Agent, or Firm* — Oliff & Berridge, PLC

(57) ABSTRACT

Disclosed is a spark ignition type internal combustion engine, which comprises a variable compression ratio mechanism capable of changing a mechanical compression ratio, and a variable valve timing mechanism capable of controlling the closing timing of an intake valve. The intake air flow to be fed to the inside of a combustion chamber is controlled mainly by changing the closing timing of an intake valve so that the mechanical compression ratio is set higher at an engine low-load running time than that at an engine high-load running time. The mechanical compression ratio at the engine low-load running time before completion of the warm-up of the internal combustion engine is set lower than that at the engine low-load running time after completion of the warm-up of the internal combustion engine. Although the expansion ratio at the engine low-load running time is raised to improve the mileage, it is possible at an engine cold start to heat an exhaust purifying catalyst promptly and to suppress the deterioration of an exhaust emission.

13 Claims, 17 Drawing Sheets

U.S. PATENT DOCUMENTS 7,292,927 B2 * 11/2007 Yasui et al. .................. 701/103
2003/0213451 A1 11/2003 Aoyama et al.

FOREIGN PATENT DOCUMENTS

| EP | 1 154 134 A2 | | 11/2001 |
| EP | 1 363 002 A1 | | 11/2003 |
| JP | 59063340 A | * | 4/1984 |
| JP | A-61-129429 | | 6/1986 |
| JP | A-2000-265873 | | 9/2000 |
| JP | A-2003-328794 | | 11/2003 |
| JP | A-2004-218522 | | 8/2004 |
| JP | A-2004-239175 | | 8/2004 |
| JP | A-2004-278415 | | 10/2004 |
| JP | 2005069131 A | * | 3/2005 |
| JP | A-2007-146701 | | 6/2007 |
| RU | 2 178 528 C2 | | 1/2002 |
| RU | 2005 114 745 A | | 1/2006 |
| WO | WO 98/49436 A1 | | 11/1998 |
| WO | WO 2004/042216 A1 | | 5/2004 |

* cited by examiner

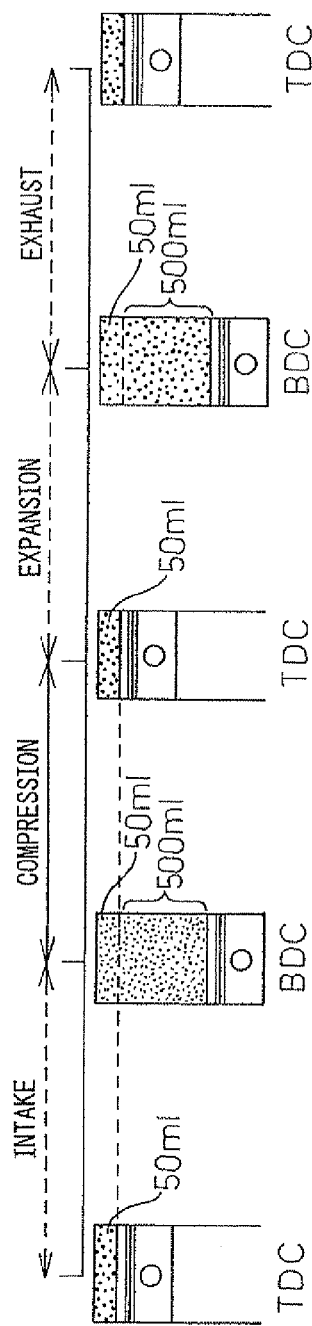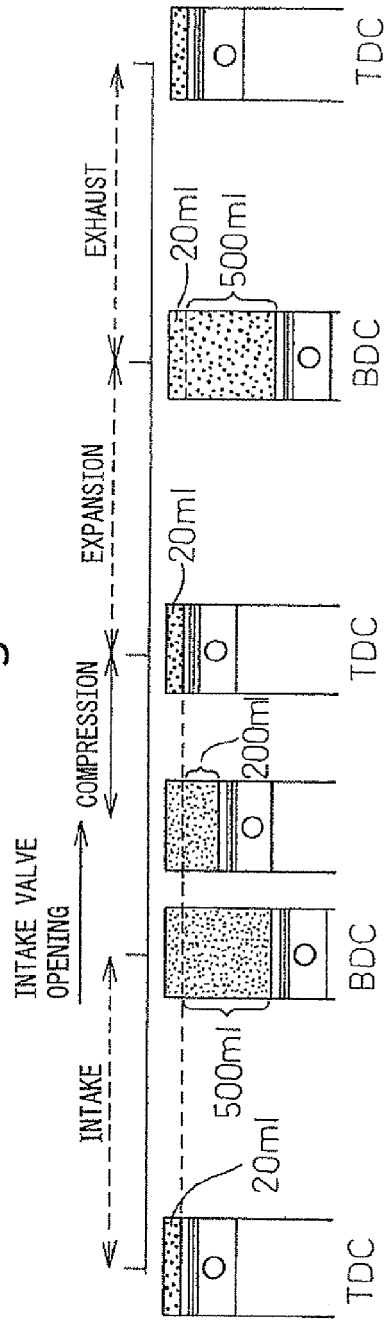

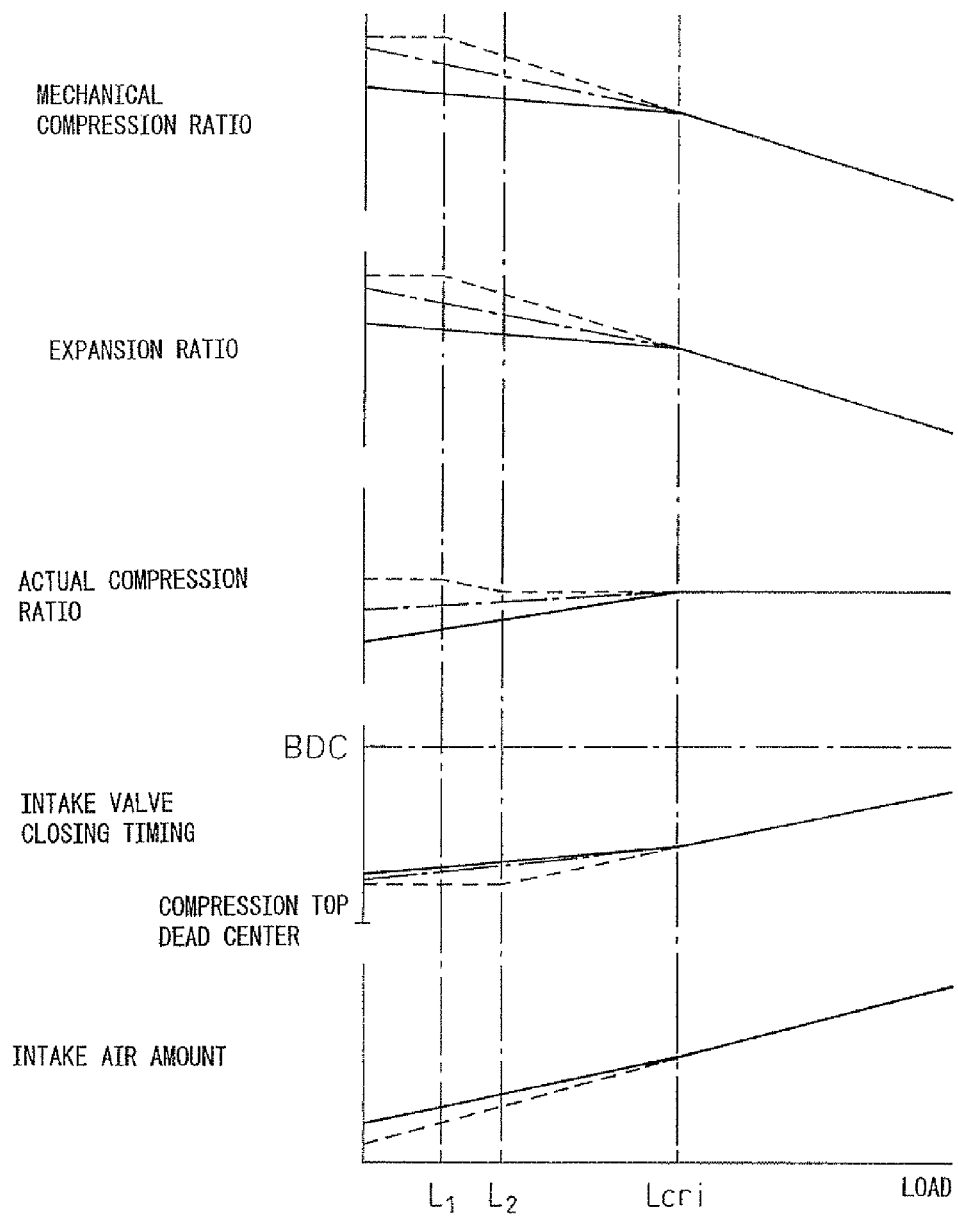

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, performing a supercharging action by a supercharger at the time of engine medium load operation and at the time of engine high load operation, and increasing the mechanical compression ratio and delaying the closing timing of the intake valve as the engine load becomes lower in a state holding an actual compression ratio constant at the times of these engine medium and high load operations (for example, see Japanese Patent Publication (A) No. 2004-218522).

In this regard, a spark ignition type internal combustion engine improving a heat efficiency at the time of vehicle operation to obtain a better fuel consumption efficiency by making the mechanical compression ratio maximum so as to obtain a maximum expansion ratio at the time of engine low load operation and by making the actual compression ratio at the time of engine low load operation substantially the same actual compression ratio as the time of engine medium and high load operation, has been proposed by the present applicant. In general, in a spark ignition type internal combustion engine, the higher the expansion ratio, the longer the time during which a pushdown force acts on the piston at the time of the expansion stroke. As a result, the heat efficiency rises. In the spark ignition type internal combustion engine proposed by the applicant, the expansion ratio is made maximum at the time of engine low load operation, so it is possible to obtain a high heat efficiency at the time of engine low load operation.

On the other hand, at the time of engine cold start, the temperature of an exhaust purification catalyst provided at the internal combustion engine (for example, a three-way catalyst) is lower than the activation temperature. For this reason, at the time of cold startup, it is necessary to rapidly raise the temperature of the exhaust purification catalyst. In this regard, as explained above, the larger the expansion ratio, the longer the time that a pushdown force acts on the piston at the time of the expansion stroke. This means that the larger the expansion ratio, the lower the temperature of the exhaust gas exhausted from the engine body. Therefore, if raising the expansion ratio at the time of cold startup, it is no longer possible to rapidly raise the temperature of the exhaust purification catalyst.

Further, at the time of engine cold start, the purification rate of unburnt HC by the exhaust purification catalyst falls. For this reason, at the time of engine cold start, it is necessary to reduce the HC contained in the exhaust gas exhausted from the engine body as much as possible. In this regard, if raising the actual compression ratio or raising the expansion ratio, the unburnt HC in the exhaust gas exhausted from the engine body tends to increase.

DISCLOSURE OF THE INVENTION

Therefore, in view of the above problems, an object of the present invention is to provide a spark ignition type internal combustion engine able to raise the expansion ratio to raise the fuel consumption efficiency at the time of engine low load operation and able to rapidly raise the temperature of the exhaust purification catalyst and able to suppress deterioration of the exhaust emission at the time of cold start.

The present invention, as means for solving the above problems, provides the spark ignition type internal combustion engine described in the claims of the claim section.

In a 1st aspect of the present invention, there is provided a spark ignition type internal combustion engine provided with a variable compression ratio mechanism able to change a mechanical compression ratio and a variable valve timing mechanism able to control a closing timing of an intake valve, an amount of intake air supplied in a combustion chamber being mainly controlled by changing the closing timing of the intake valve, and the mechanical compression ratio being made higher at the time of engine low load operation compared with the time of engine high load operation, wherein the mechanical compression ratio at the time of engine low load operation before the internal combustion engine finishes warming up is made a compression ratio lower than the mechanical compression ratio at the time of engine low load operation after the internal combustion engine finishes warming up.

According to the above aspect, before the internal combustion engine finishes warming up, the mechanical compression ratio is a compression ratio lower than after it finishes warming up. Therefore, before the internal combustion engine finishes warming up, the expansion ratio is also not made maximum and therefore the drop in the temperature of the exhaust gas is suppressed.

Therefore, according to the above aspect, before the internal combustion engine finishes warming up, the drop in the temperature of the exhaust gas is suppressed. Therefore, at the time of engine cold start, it is possible to rapidly raise the temperature of the exhaust purification catalyst, while after the internal combustion engine finishes warming up, it is possible to increase the expansion ratio and raise the fuel consumption efficiency at the time of engine low load operation.

In a 2nd aspect of the present invention, at the time of engine low load operation, the mechanical compression ratio is made the maximum mechanical compression ratio and, before the internal combustion engine finishes warming up, even at the time of engine low load operation, the mechanical compression ratio is made a compression ratio lower than the maximum compression ratio.

In a 3rd aspect of the present invention, at the time of engine low load operation, the expansion ratio is made 20 and, before the internal combustion engine finishes warming up, even at the time of engine low load operation, the mechanical compression ratio is set so that the expansion ratio becomes less than 20.

In a 4th aspect of the present invention, the closing timing of the intake valve is moved in a direction away from intake bottom dead center until the limit closing timing able to control the amount of intake air supplied in the combustion chamber as the engine load becomes lower, and before the internal combustion engine finishes warming up, even at the time of engine low load operation, the closing timing of the intake valve is only moved to the closing timing at the intake bottom dead center side from the above limit closing timing.

In a 5th aspect of the present invention, before the internal combustion engine finishes warming up, the mechanical compression ratio is made lower when the temperature of the exhaust purification catalyst provided in the engine exhaust passage is low compared with when it is high.

In a 6th aspect of the present invention, before the internal combustion engine finishes warming up, the closing timing of the intake valve is set so that the actual compression ratio is maintained in a predetermined range regardless of the temperature of the exhaust purification catalyst.

In a 7th aspect of the present invention, before the internal combustion engine finishes warming up, the mechanical compression ratio is made higher the higher the temperature of the exhaust purification catalyst.

In a 8th aspect of the present invention, the mechanical compression ratio is set based on the temperature of the exhaust purification catalyst at the time of engine start so that the mechanical compression ratio becomes lower when the temperature of the exhaust purification catalyst is low compared with when it is high, and the mechanical compression ratio is maintained at the mechanical compression ratio set based on the temperature of the exhaust purification catalyst at the time of engine start until the internal combustion engine finishes warming up.

In a 9th aspect of the present invention, before the internal combustion engine finishes warming up, the actual compression ratio is made lower when the temperature of the exhaust purification catalyst is low compared with when it is high.

In a 10th aspect of the present invention, before the internal combustion engine finishes warming up, the actual compression ratio is made lower when the temperature of the exhaust purification catalyst is low compared with when it is high.

In a 11th aspect of the present invention, before the internal combustion engine finishes warming, the actual compression ratio is made lower when the temperature of the engine cooling water is low compared with when it is high.

In a 12th aspect of the present invention, before the internal combustion engine finishes warming up, in the temperature region where the temperature of the engine cooling water is higher than a reference temperature, the actual compression ratio is made lower when the temperature of the engine cooling water is low compared with when it is high, and in the temperature region where the temperature of the engine cooling water is lower than the reference temperature, the actual compression ratio is made higher when the temperature of the engine cooling water is low compared with when it is high.

In a 13th aspect of the present invention, after a constant time elapses after the startup of the internal combustion engine, even in the temperature region where the temperature of the engine cooling water is lower than a reference temperature, the actual compression ratio is made lower when the temperature of the engine cooling water is low compared with when it is high.

In a 14th aspect of the present invention, the above constant time is made longer the lower the temperature of the engine cooling water at the time of engine start.

In a 15th aspect of the present invention, before the internal combustion engine finishes warming up, the actual compression ratio is made higher when the vaporization rate of the fuel supplied to the internal combustion engine is low compared with when it is high.

Below, the present invention will be understood more clearly from the attached drawings and the description of the preferred embodiments of the present invention.

BRIEF DESCRIPTION OF DRAWINGS

FIG. 8A and FIG. 8B are views for explaining an ordinary cycle and superhigh expansion ratio cycle.

FIG. 13 is a view showing changes in the mechanical compression ratio etc. in accordance with the engine load in the case of performing the cold start control of the second embodiment.

BEST MODE FOR CARRYING OUT THE INVENTION

Figure 1:
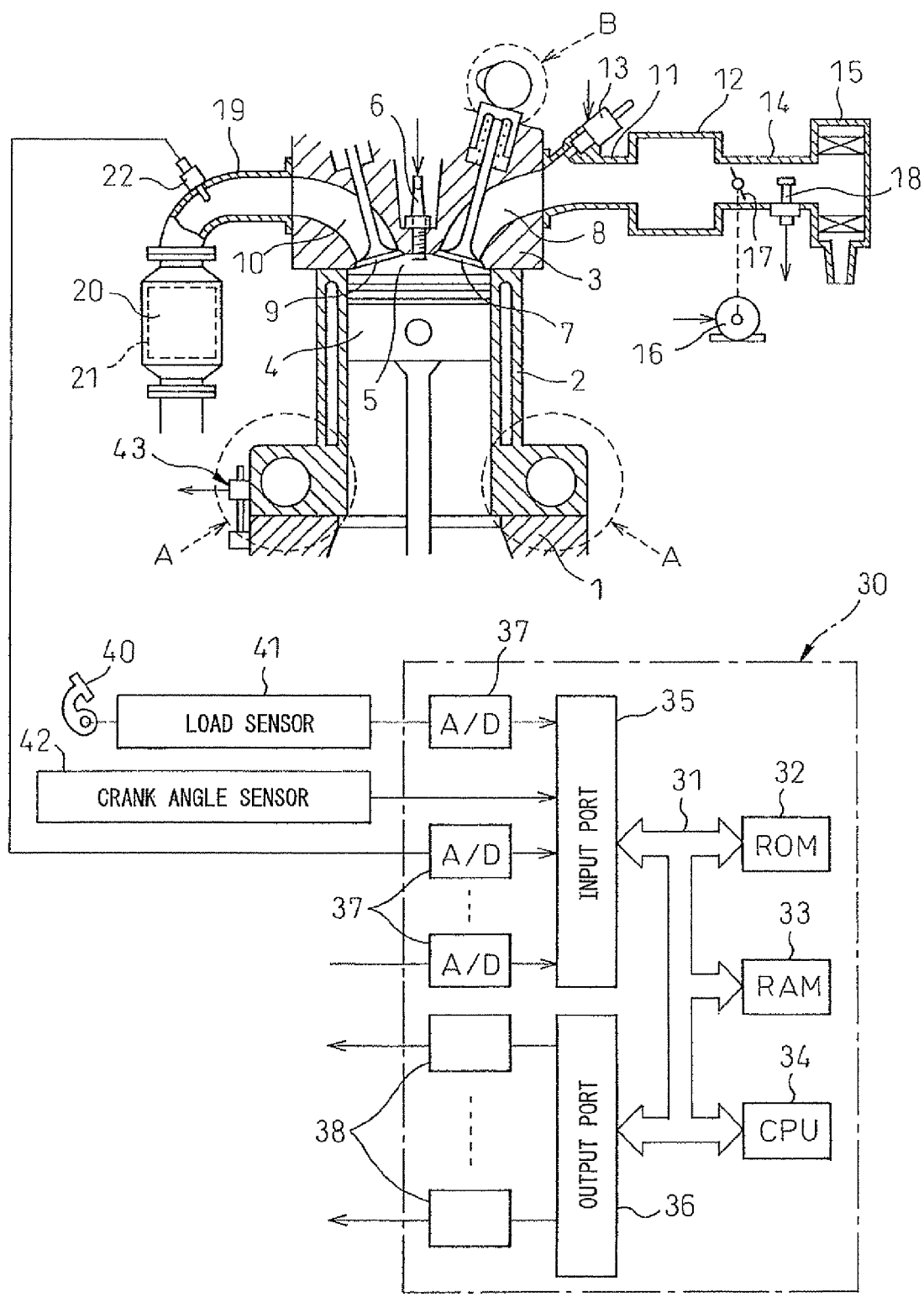
FIG. 1 is an overall view of a spark ignition type internal combustion engine.

Below, embodiments of the present invention will be explained with reference to the drawings. Note that the same or similar components in the drawings are assigned the same notations.

FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, and the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing an exhaust gas purification catalyst (for example, a three-way catalyst). The exhaust manifold 19 is provided inside it with an air-fuel ratio sensor 22.

Further, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center. The internal combustion engine is further provided with a variable valve mechanism B able to control the closing timing of the intake valve 7 so as to change the start timing of actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 22 are input through corresponding AD converters 37 to the input port 35. Further, the accelerator pedal 40 is connected to a load sensor 41 generating an output voltage proportional to the amount of depression of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the corresponding drive circuits 38 to a spark plug 6, fuel injector 13, throttle valve drive actuator 16, variable compression ratio mechanism A and variable valve timing mechanism B.

Figure 2:
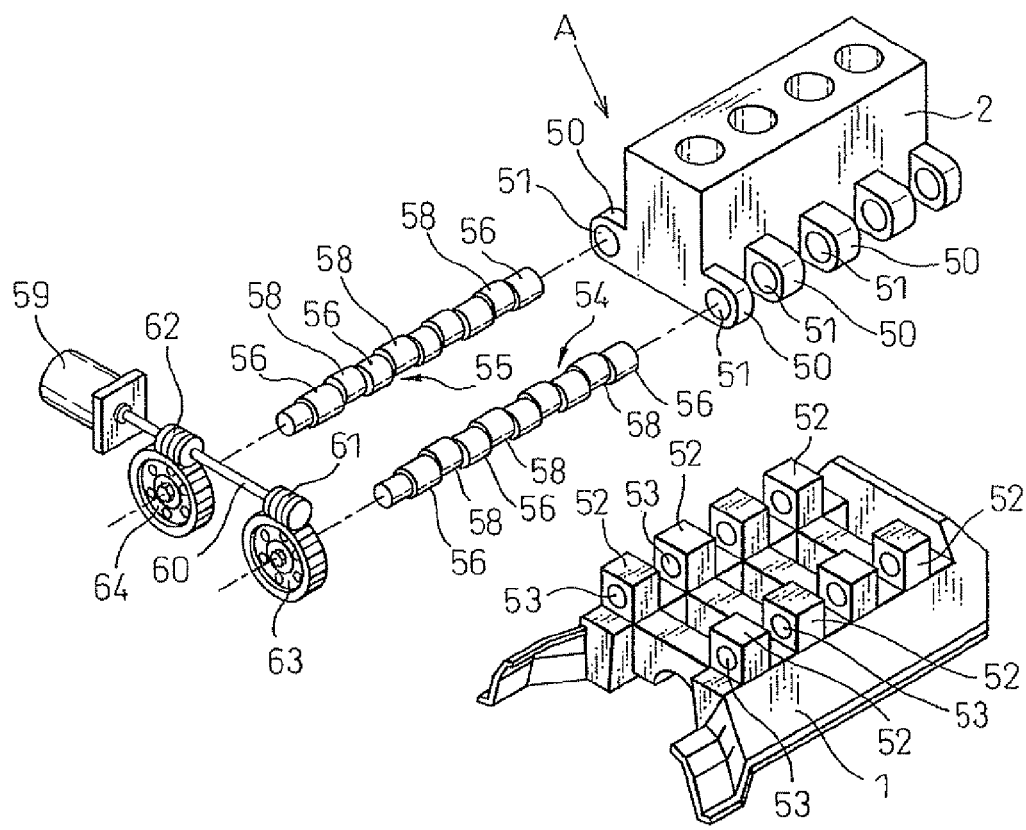
FIG. 2 is an exploded perspective view of a variable compression ratio mechanism.
Figure 3A:
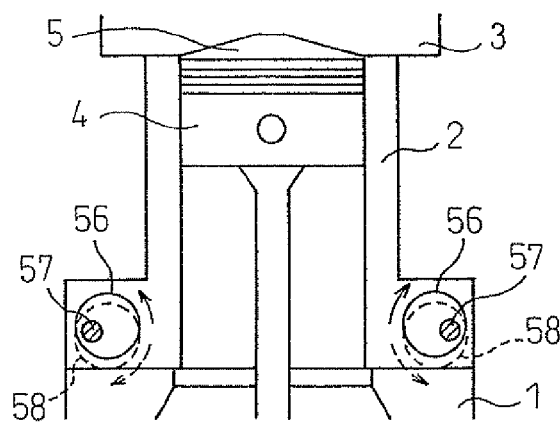
FIG. 3A and FIG. 3B are side cross-sectional views of an internal combustion engine schematically illustrated.
Figure 3B:
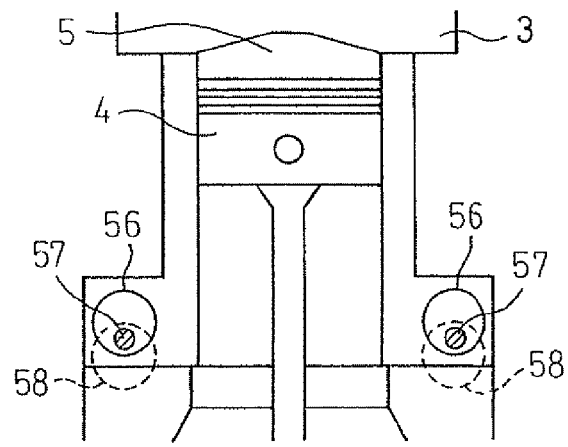

FIG. 2 is an exploded perspective view of the variable compression ratio mechanism A shown in FIG. 1, while FIG. 3A and FIG. 3B are side cross-sectional views of the internal combustion engine schematically illustrated. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55, respectively. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3B shows an example. Any type of variable compression ratio mechanism may be used.

Figure 4:
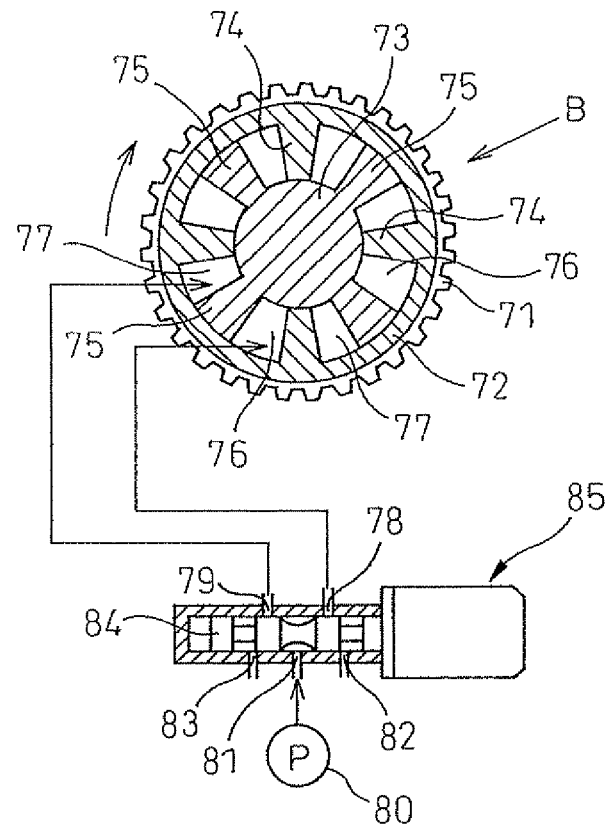
FIG. 4 is a view showing a variable valve timing mechanism.

On the other hand, further, FIG. 4 shows a variable valve timing mechanism B attached to the end of the cam shaft 70 for driving the intake valve 7 in FIG. 1. As shown in FIG. 4, the variable valve timing mechanism B is provided with a timing pulley 71 made to rotate by an engine crank shaft through a timing belt in the arrow direction, a cylindrical housing 72 rotating together with the timing pulley 71, a rotation shaft 73 able to rotate together with the cam shaft 70 and rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 85. This working oil feed control valve 85 is provided with hydraulic ports 78, 79 connected to the hydraulic chambers 76, 77, a feed port 81 for feeding working oil discharged from a hydraulic pump 80, a pair of drain ports 82, 83, and a spool valve 84 for controlling connection and disconnection of the ports 78, 79, 81, 82, 83.

To advance the phase of the cams of the cam shaft 70, the spool valve 84 is made to move right in FIG. 4, working oil fed from the feed port 81 is fed through the hydraulic port 78 to the advancing use hydraulic chambers 76, and working oil in the retarding use hydraulic chambers 77 is drained from the drain port 83. At this time, the rotation shaft 73 is made to rotate relative to the cylindrical housing 72 in the arrow direction.

As opposed to this, to retard the phase of the cams of the cam shaft 70, the spool valve 84 is made to move left in FIG. 4, working oil fed from the feed port 81 is fed through the hydraulic port 79 to the retarding use hydraulic chambers 77, and working oil in the advancing use hydraulic chambers 76 is drained from the drain port 82. At this time, the rotation shaft 73 is made to rotate relative to the cylindrical housing 72 in the direction opposite to the arrow direction.

When the rotation shaft 73 is made to rotate relative to the cylindrical housing 72, if the spool valve 84 is returned to the neutral position shown in FIG. 4, the operation for relative rotation of the rotation shaft 73 is ended, and the rotation shaft 73 is held at the relative rotational position at that time. Therefore, it is possible to use the variable valve timing mechanism B so as to advance or retard the phase of the cam of the cam shaft 70 by exactly the desired amount.

Figure 5:
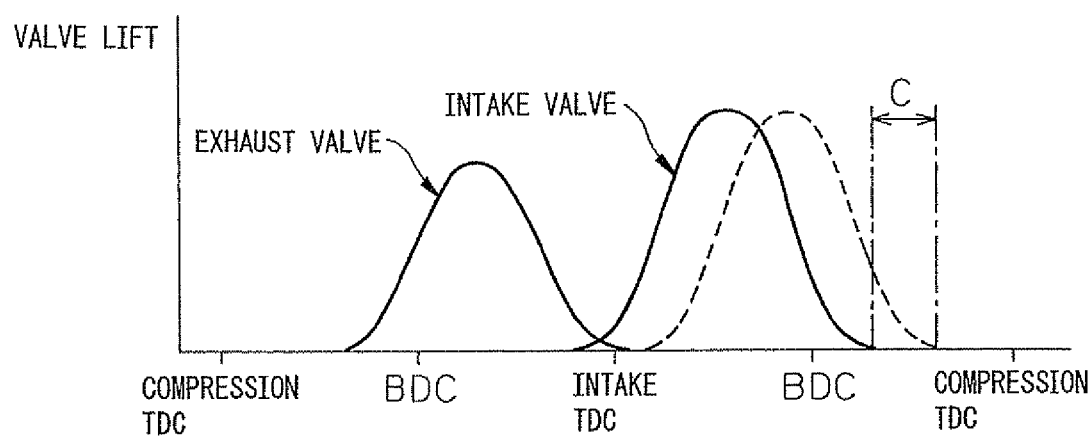
FIG. 5 is a view showing an amount of lift of an intake valve and exhaust valve.

In FIG. 5, the solid line shows the case where the phase of the cams of the cam shaft 70 is maximally advanced by the variable valve timing mechanism B, and the broken line shows the case where the phase of the cams of the cam shaft 70 is maximally retarded. Therefore, the opening period of the intake valve 70 can be freely set between the period shown in the solid line and the period shown in the broken line in FIG. 5, and thus the closing timing of the intake valve can be set to a given crank angle within the range indicated by the arrow C in FIG. 5.

Note that the variable valve timing mechanism B shown in FIGS. 1 and 4 shows an example. It is also possible to use various types of variable valve timing mechanism, such as a variable valve timing mechanism able to change the closing timing of the intake valve with the opening timing thereof maintained constant. Further, although the variable valve timing mechanism B is used for changing the start timing of the actual compression action in the present invention, it is also possible to use various types of actual compression action start timing changing mechanisms able to change the start timing of actual compression action, other than the variable valve timing mechanism.

Figure 6A:
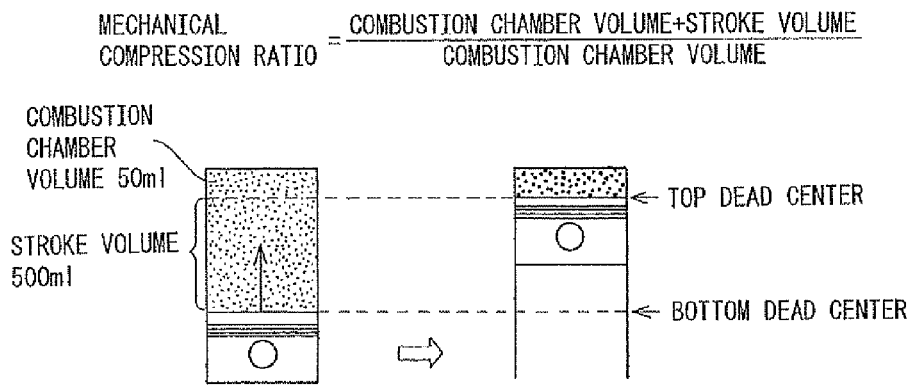
FIG. 6A to FIG. 6C are views for explaining a mechanical compression ratio, an actual compression ratio and an expansion ratio.
Figure 6B:
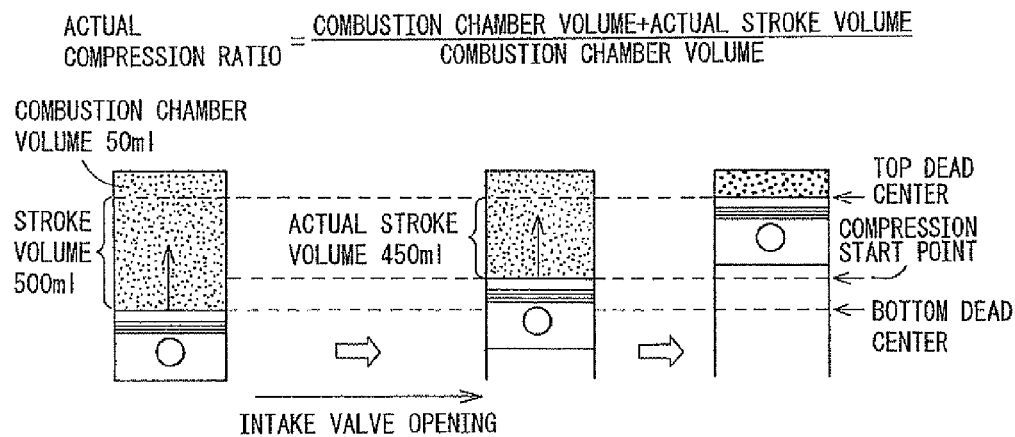
Figure 6C:
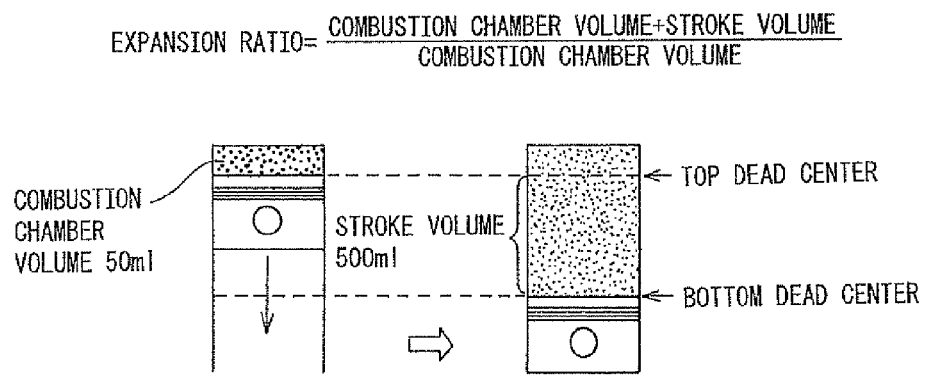

Next, the meaning of the terms used in the present application will be explained with reference to FIG. 6A to FIG. 6C. Note that FIG. 6A, FIG. 6B and FIG. 6C show for explanatory purposes an engine with a volume of the combustion chambers of 50 ml and a stroke volume of the piston of 500 ml. In these FIG. 6A, FIG. 6B and FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, the most basic features of the present invention will be explained with reference to FIG. 7, FIG. 8A and FIG. 8B. Note that FIG. 7 shows the relationship between the theoretical thermal efficiency and the expansion ratio, while FIG. 8A and FIG. 8B show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near compression bottom dead center. In the example shown in this FIG. 8A as well, in the same way as the examples shown in FIGS. 6A, 6B and 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
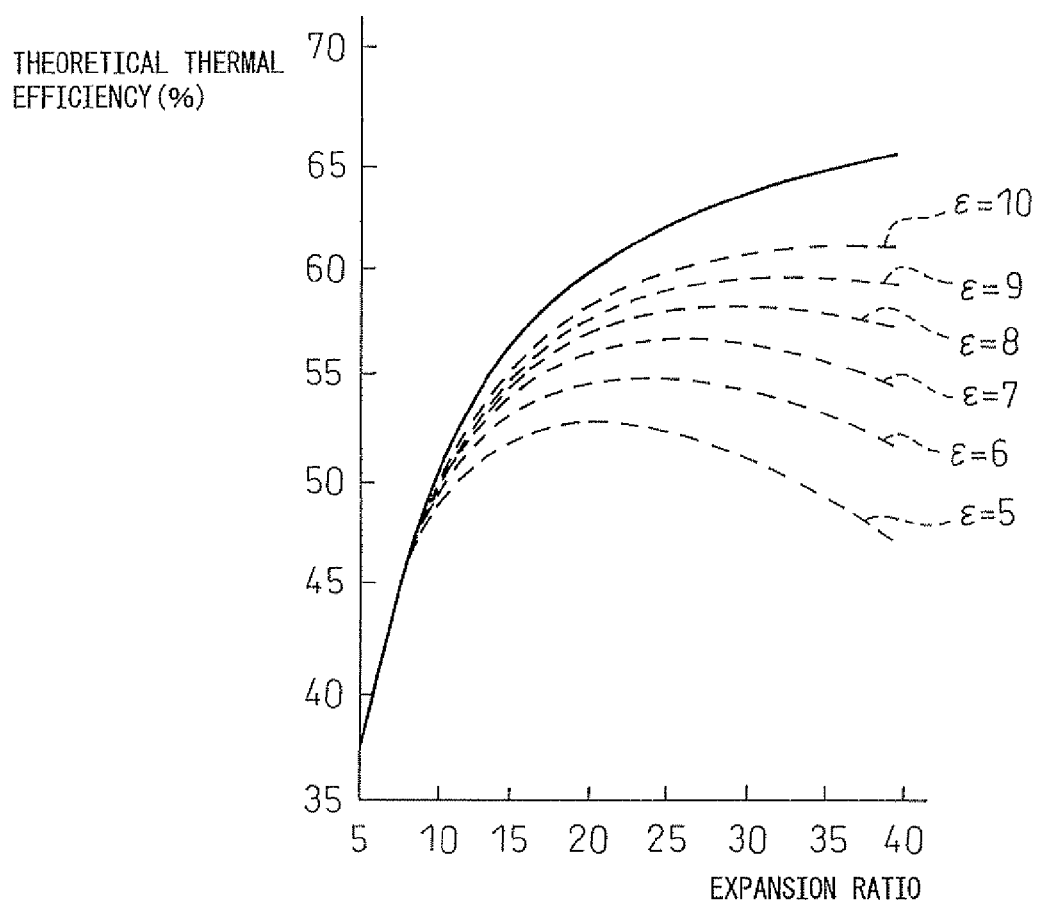
FIG. 7 is a view showing the relationship of the theoretical thermal efficiency and expansion ratio.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line of $\epsilon=10$ in FIG. 7 shows the theoretical thermal efficiency in the case of fixing the actual compression ratio at 10 and raising the expansion ratio in that state. It is learned that the amount of rise of the theoretical thermal efficiency when raising the expansion ratio in the state where the actual compression ratio is maintained at a low value in the above way and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set.

Next, the operational control as a whole will be explained with reference to FIG. 9.

Figure 9:
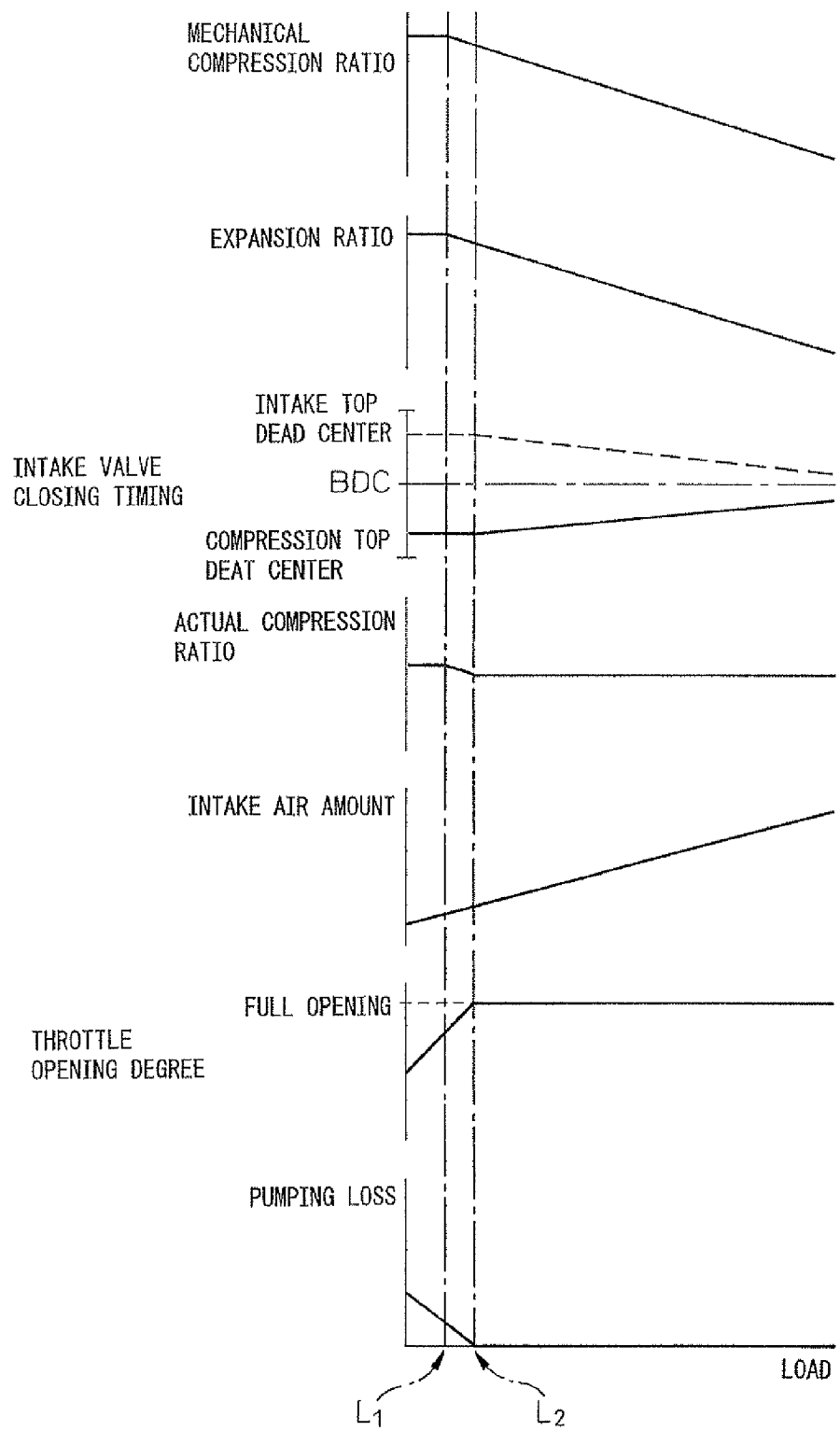
FIG. 9 is a view showing changes in the mechanical compression ratio etc. in accordance with the engine load in the case of performing superhigh expansion ratio control.

FIG. 9 shows the changes in the mechanical compression ratio, the expansion ratio, the closing timing of the intake valve 7, the actual compression ratio, the amount of intake air, the opening degree of the throttle valve 17, and the pumping loss according to the engine load. Note that in the embodiments according to the present invention, to enable the three-way catalyst 21 in the catalytic converter 20 to simultaneously reduce the unburned HC, CO, and $NO_X$ in the exhaust gas, ordinarily the average air-fuel ratio in the combustion chamber 5 is feedback controlled to the stoichiometric air-fuel ratio based on the output signal of the air-fuel ratio sensor 22.

As explained above, at the time of engine high load operation, the ordinary cycle shown in FIG. 8A is executed. Therefore, as shown in FIG. 9, at this time, the mechanical compression ratio is made low so that the expansion ratio is made low and, as shown by the solid line in FIG. 5, the closing timing of the intake valve 7 is advanced. Further, at this time, the amount of intake air is large, and at this time, the opening degree of the throttle valve 17 is maintained fully opened or substantially fully opened, so the pumping loss becomes zero.

On the other hand, as shown in FIG. 9, along with the reduction in the engine load, the closing timing of the intake valve is delayed as shown by the solid line in FIG. 9 so as to reduce the amount of the intake air. Further, at this time, along with the reduction in the engine load, the mechanical compression ratio is increased so that the actual compression ratio is held substantially constant, therefore the expansion ratio is also increased. Note that at this time as well, the throttle valve 17 is held at the fully opened or substantially fully opened state, therefore the amount of intake air fed to the combustion chamber 5 is controlled not by the throttle valve 17 but by changing the closing timing of the intake valve 7. At this time as well, the pumping loss becomes zero.

In this way, when the engine load becomes lower from the engine high load operation state, the mechanical compression ratio is increased along with the reduction in the intake air amount under a substantially constant actual compression ratio. That is, the volume of the combustion chamber 5 when the piston 4 reaches compression top dead center is reduced proportionally to the reduction in the intake air amount. Therefore, the volume of the combustion chamber 5 when the piston 4 reaches compression top dead center changes in proportion to the intake air amount. Note that, at this time, the air-fuel ratio in the combustion chamber 5 becomes the stoichiometric air-fuel ratio, so the volume of the combustion chamber 5 when the piston 4 reaches compression top dead center changes in proportion to the amount of fuel.

If the engine load becomes further lower, the mechanical compression ratio is further increased. If the mechanical compression ratio reaches the limit mechanical compression ratio serving as the structural upper limit of the combustion chamber 5, in the region where the load is lower than the engine load $L_1$ when the mechanical compression ratio reaches the limit mechanical compression ratio, the mechanical compression ratio is held at the limit mechanical compression ratio. Therefore, at the time of engine low load operation, the mechanical compression ratio becomes maximum and the expansion ratio also becomes maximum. In other words, in the present invention, at the time of engine low load operation, the mechanical compression ratio is made maximum so that the maximum expansion ratio is obtained. Further, at this time, the actual compression ratio is maintained at substantially the same actual compression ratio as the time of engine medium and high load operation.

On the other hand, as shown by the solid line in FIG. 9, the closing timing of the intake valve 7 is retarded along with the drop in the engine load until the limit closing timing at which the amount of intake air supplied in the combustion chamber 5 can be controlled by changing the closing timing of the intake valve 7. In the region where the load is lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, it is necessary to control the intake air amount by some other sort of method since the closing timing of the intake valve 7 can no longer be used to control the intake air amount.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. However, if the throttle valve 17 is used to control the amount of intake air, as shown in FIG. 9, the pumping loss increases.

Note that in order to prevent such pumping loss from occurring, in the region of a load lower than the engine load $L_2$ when the closing timing of the intake valve 7 reaches the limit closing timing, the air-fuel ratio may be made larger the lower the engine load, in the state holding the throttle valve 17 fully opened or substantially fully opened. At this time, the fuel injector 13 is preferably arranged in the combustion chamber 5 to perform stratified combustion.

As shown in FIG. 9, at the time of engine low speed, regardless of the engine load, the actual compression ratio is held substantially constant. The actual compression ratio at this time is set within the range of about ±10 percent with respect to the actual compression ratio at the time of engine medium and high load operation, preferably ±5 percent. Note that in the present embodiment, the actual compression ratio at the time of engine low speed is made about 10±1, that is, from 9 to 11. However, if the engine speed becomes higher, turbulence occurs in the air-fuel mixture in the combustion chamber 5, and as a result knocking tends to not occur, therefore in the embodiment according to the present invention, the higher the engine speed, the higher the actual compression ratio.

On the other hand, as explained above, in the superhigh expansion ratio cycle shown in FIG. 8B, the expansion ratio is made 26. The higher this expansion ratio, the more preferable, but as will be understood from FIG. 7, even for the practically usable lower limit compression ratio $\epsilon=5$, a considerably high theoretical thermal efficiency can be obtained if 20 or more. Therefore, in the present invention, the variable compression ratio mechanism A is formed so that the expansion ratio becomes 20 or more.

Further, in the example shown in FIG. 9, the mechanical compression ratio is changed continuously in accordance with the engine load. However, the mechanical compression ratio can also be changed in stages in accordance with the engine load.

On the other hand, as shown by the broken line in FIG. 9, as the engine load becomes lower, by advancing the closing timing of the intake valve 7 as well, it is possible to control the amount of intake air without changing the opening degree of the throttle valve. Therefore, to comprehensively express both the case shown by the solid line and the case shown by the broken line in FIG. 9, in the embodiment according to the present invention, the closing timing of the intake valve 7 is shifted, as the engine load becomes lower, in a direction away from compression bottom dead center BDC until the limit closing timing $L_2$ enabling control of the amount of intake air fed into the combustion chamber.

Note that, in the above embodiment, the mechanical compression ratio and the closing timing of the intake valve are controlled so as to maintain the actual compression ratio substantially constant regardless of the engine load. However, it is not necessarily required to control these so that the actual compression ratio is maintained substantially constant. However, even if not controlling these to maintain the actual compression ratio substantially constant, basically it is necessary to increase the mechanical compression ratio as engine load becomes lower and move the closing timing of the intake valve away from intake bottom dead center.

In this regard, as explained above, if increasing the expansion ratio, the time during which a pushdown force acts on the piston during the expansion stroke becomes longer. As a result, the time during which the piston gives the crankshaft a rotary force becomes longer. That is, if increasing the expansion ratio, the ratio of the heat energy in the combustion chamber 5 generated due to the combustion converted to kinetic energy of the piston becomes larger. For this reason, when the expansion ratio is large, that is, when executing a superhigh expansion ratio cycle, the heat energy of the exhaust gas exhausted from the engine body is small and therefore the temperature of the exhaust gas is low.

On the other hand, in the three-way catalyst 21 arranged in the exhaust passage of the internal combustion engine, it is necessary that the temperature of the three-way catalyst 21 become a certain temperature (for example, activation temperature) or more so as to optimally purify the unburnt HC, CO, and $NO_X$ contained in the exhaust gas running through the three-way catalyst 21. Here, at the time of engine cold start, the temperature of the three-way catalyst 21 is lower than the activation temperature. For this reason, at the time of cold start, it is necessary to rapidly raise the temperature of the three-way catalyst 21 so as to optimally purify the exhaust gas.

Here, at the time of startup of an internal combustion engine, usually an idling operation is performed over a certain period and therefore the engine load is low. Therefore, if performing control in the above way, at the time of engine cold start, a superhigh expansion ratio cycle is executed. In this regard, as explained above, in the superhigh expansion ratio cycle, the temperature of the exhaust gas exhausted from the engine body is low. For this reason, if performing the above-mentioned control, at the time of engine cold start, it is no longer possible to rapidly raise the temperature of the three-way catalyst 21.

Further, as explained above, at the time of the engine cold start, the temperature of the three-way catalyst 21 is lower than the activation temperature and, therefore, the purification rate of the unburnt HC, CO, and $NO_X$ by the three-way catalyst 21 falls. For this reason, at the time of engine cold start, to keep the concentration of unburnt HC etc. in the exhaust gas exhausted from the three-way catalyst 21 low, it is necessary to lower the concentration of the unburnt HC in the exhaust gas exhausted from the combustion chamber 5.

In this regard, at the superhigh expansion ratio cycle, the concentration of the unburnt HC in the exhaust gas exhausted from the combustion chamber 5 tends to become higher. That is, if the expansion ratio (mechanical compression ratio) is high, the position of the top surface of the piston 4 at compression top dead center becomes close to the entrance of the exhaust port 10. For this reason, the unburnt HC deposited on the cylinder bore is scraped up close to the entrance of the exhaust port 10 by the rise of the piston. The unburnt HC scraped up close to the entrance of the exhaust port 10 is easily exhausted together with the exhaust gas into the exhaust port 10. As a result, the concentration of the unburnt HC in the exhaust gas exhausted from the combustion chamber 5 ends up becoming higher.

Therefore, in the first embodiment of the present invention, at the time of engine cold start, the superhigh expansion ratio cycle is not executed even at the time of the above-mentioned engine low load operation.

Figure 10:
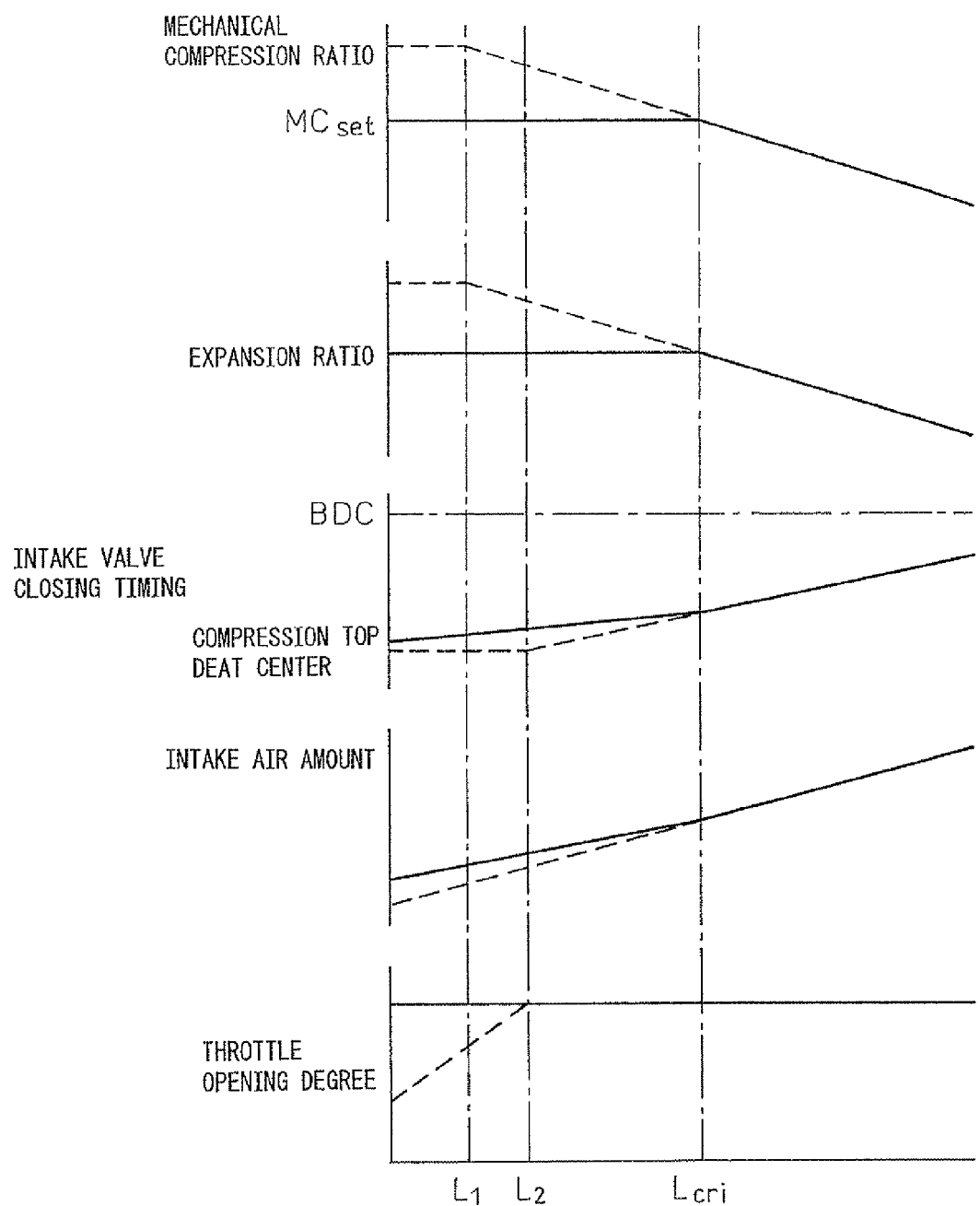
FIG. 10 is a view showing changes in the mechanical compression ratio etc. in accordance with the engine load in the case of performing cold start control.

FIG. 10 is a view showing changes in the mechanical compression ratio, expansion ratio, closing timing of the intake valve 7, intake air amount, and opening degree of the throttle valve 17 in accordance with the engine load at the time of engine cold start. FIG. 10 shows only the region where the load is relatively low. Note that, the broken line in the figure shows the changes in the parameters when executing superhigh expansion ratio control executing a superhigh expansion ratio cycle at the time of engine low load operation. Further, in FIG. 10, the case of controlling the intake air amount by delaying the closing timing of the intake valve 7 as the engine load becomes lower is explained, but similar control is possible even when controlling the intake air amount by advancing the closing timing of the intake valve 7 as the engine load becomes lower. In the following explanation, the control shown in FIG. 10 is called "cold start control" as opposed to the superhigh expansion ratio control shown in FIG. 10.

As shown in FIG. 10, in cold start control, at the time of engine medium and high load operation, the mechanical compression ratio, the closing timing of the intake valve 7, and the throttle opening degree are controlled in the same way as the superhigh expansion ratio control shown in FIG. 9. Along with this, the expansion ratio and intake air amount are controlled in the same way as the superhigh expansion ratio control shown in FIG. 9. This is because even if performing the superhigh expansion ratio control shown in FIG. 9, at the time of engine medium and high load operation, the expansion ratio is not made that high and as a result the temperature of the exhaust gas exhausted from the engine body becomes a high temperature.

On the other hand, in the case where cold start control is performed, at the time of engine low load operation, in particular when the engine load is lower than a certain constant load (hereinafter referred to as the "reference load") $L_{cri}$, the mechanical compression ratio is made lower than the case where superhigh expansion ratio control is performed. In particular, in the present embodiment, when the engine load is lower than the reference load $L_{cri}$, the mechanical compression ratio is made a substantially constant mechanical compression ratio (hereinafter referred to as the "set mechanical compression ratio") $MC_{set}$ regardless of the engine load, and the expansion ratio is also made an expansion ratio corresponding to this set mechanical compression ratio.

Here, the set mechanical compression ratio $MC_{set}$ is made smaller than the limit compression ratio, for example, smaller than 20. Therefore, when performing superhigh expansion ratio control, at the time of engine low load operation, the mechanical compression ratio reaches the limit compression ratio and is made maximum, while when performing cold start control, at the time of engine low load operation, the mechanical compression ratio does not reach the limit compression ratio and therefore is not made maximum. That is, in the present embodiment, when the internal combustion engine has not finished being warmed up and therefore cold start control is being performed, the mechanical compression ratio is lowered compared with when the internal combustion engine has finished being warmed up and cold start control is not being performed (that is, when superhigh expansion ratio control is being performed).

Further, the expansion ratio changes along with a change of the mechanical compression ratio. Therefore, when performing superhigh expansion ratio control, the expansion ratio is made maximum at the time of engine low load operation, while when performing cold start control, the expansion ratio is not made maximum at the time of engine low load operation. That is, in the present embodiment, when the internal combustion engine has not finished warming up and therefore performing cold start control, the expansion ratio is made lower than when the internal combustion engine finishes warming up and not performing cold start control.

As explained above, at the time of engine cold start, engine low load operation is performed in almost all cases. However, when performing cold start control, even at the time of engine low load operation, the expansion ratio is not made maximum and the expansion ratio is made lower than when performing superhigh expansion ratio control, so the temperature of the exhaust gas also does not become that low. For this reason, even at the time of engine cold start, it becomes possible to rapidly raise the temperature of the three-way catalyst 21.

Further, when performing cold start control, even at the time of engine low load operation, the mechanical compression ratio is not made maximum and the mechanical compression ratio is made lower than when performing superhigh expansion ratio control, so the position of the top surface of the piston 4 at compression top dead center is away from the entrance of the exhaust port 10 to a certain extent, so the concentration of the unburnt HC in the exhaust gas exhausted from the combustion chamber 5 can be kept low.

Further, in case where cold start control is performed, at the time of engine low load operation, in particular when the engine load is lower than the above reference load $L_{cri}$, the closing timing of the intake valve 7 is advanced compared with the case where superhigh expansion ratio control is performed (that is, the closing timing of the intake valve 7 is made to approach intake bottom dead center). In particular, in the present embodiment, in the case where cold start control is performed, when the engine load is lower than the reference load $L_{cri}$, the ratio of change of the closing timing of the intake valve 7 with respect to change of the engine load is made smaller than the case where superhigh expansion ratio control is performed. This is because in the case where cold start control is performed, it is necessary to increase the amount of the air-fuel mixture supplied to the combustion chamber 4 by exactly the amount for raising the temperature of the exhaust gas and therefore it is necessary to increase the intake air amount compared with the case where superhigh expansion ratio control is performed.

In this way, in the case where cold start control is performed, even at the time of engine low load operation, it is necessary to make the amount of intake air relatively large to raise the temperature of the exhaust gas. For this reason, the amount of intake air to be supplied into the combustion chamber 5 does not become so small that the intake air amount can no longer be controlled by the closing timing of the intake valve 7. Therefore, even in the region where the engine load is extremely low, the intake air amount can be controlled by changing the closing timing of the intake valve 7. For this reason, in the case where cold start control is performed, the closing timing of the intake valve 7 never reaches the limit closing timing, but is always made a timing earlier than the limit closing timing.

In this way, when in the case where cold start control is performed, even in the region where the engine load is extremely low, it is possible to control the intake air amount by the closing timing of the intake valve 7, so it is not necessary to control the intake air amount by the throttle valve 17. Therefore, in the case where cold start control is performed, the throttle valve 17 is held as fully opened or substantially fully opened.

However, it is not necessarily required to control the intake air amount by only the closing timing of the intake valve 7. For example, when the engine load is lower than the reference load $L_{cri}$, it is also possible to make the closing timing of the intake valve 7 constant and use the throttle valve 17 to control the intake air amount. However, whatever the case, when in the case where cold start control is performed, the closing timing of the intake valve 7 does not become the limit closing timing.

Note that, with cold start control, when the engine load is lower than the reference load $L_{cri}$, the mechanical compression ratio is made the set mechanical compression ratio. In this connection, reference load $L_{cri}$ may be set as, for example, an engine load wherein when the engine load is lower than this reference load, if executing superhigh expansion ratio control, the temperature of the exhaust gas can no longer be raised sufficiently to rapidly raise the temperature of the three-way catalyst 21, or as an engine load higher than this engine load. That is, the reference load $L_{cri}$ is made the load where it is possible to rapidly raise the temperature of the three-way catalyst 21 even if performing superhigh expansion ratio control when the engine load is the reference load $L_{cri}$ or more, but it is not possible to rapidly raise the temperature of the three-way catalyst 21 if performing superhigh expansion ratio control when the engine load is lower than the reference load $L_{cri}$.

Figure 11:
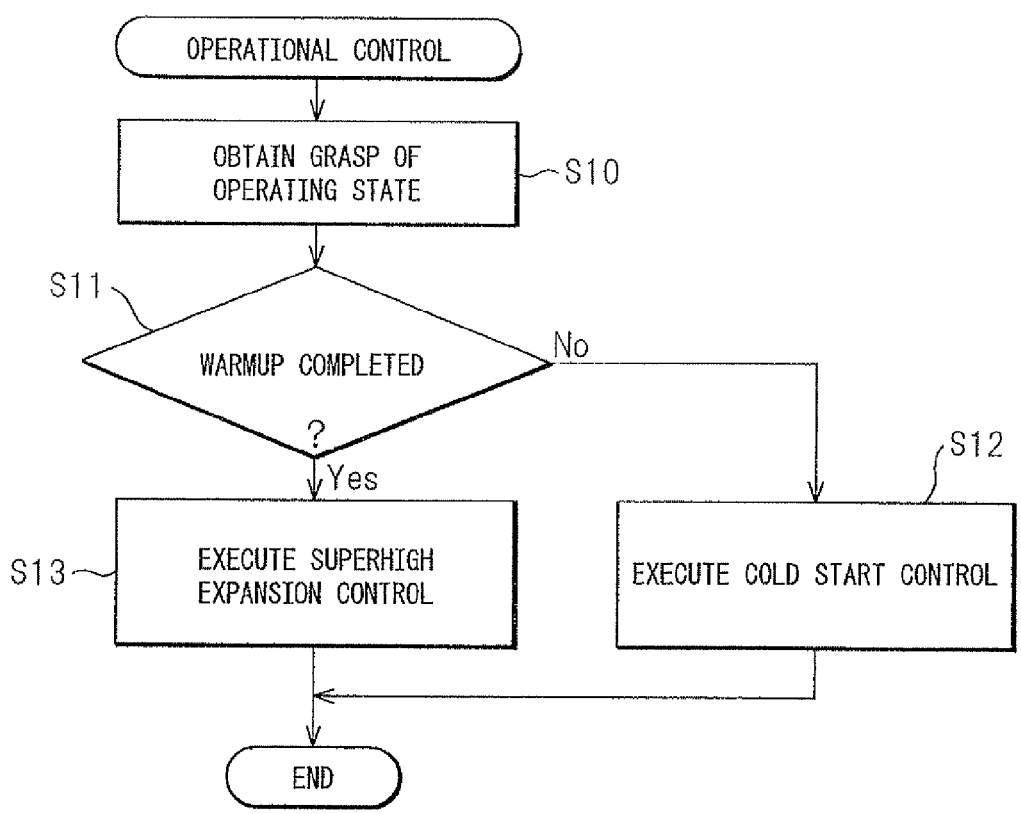
FIG. 11 is a flowchart showing a control routine of operational control of an internal combustion engine.

FIG. 11 is a flowchart showing a control routine of operational control of an internal combustion engine. The illustrated control routine is performed by interruption every predetermined time interval.

As shown in FIG. 11, first, at step S10, the operating state of the internal combustion engine is detected. The detected parameter may be, for example, the temperature of the three-way catalyst 21, engine cooling water temperature, elapsed time after internal combustion engine startup, temperature of the exhaust gas upstream or downstream of the three-way catalyst 21, etc. These parameters are detected by, for example, the temperature sensor provided at the three-way catalyst 21, the water temperature sensor detecting the engine cooling water temperature, the temperature sensor provided in the exhaust pipe upstream or downstream of the three-way catalyst 21, etc.

Next, at step S11, it is judged if the internal combustion engine, in particular, the three-way catalyst 21, has finished warming up. In the present embodiment, when the temperature of the three-way catalyst 21 detected by the temperature sensor at step S10 is the detected activation temperature or higher, when the engine cooling water temperature detected by the water temperature sensor is a predetermined temperature or more, when a predetermined time or more after the startup of the internal combustion engine elapses, or when the temperature of the exhaust gas upstream or downstream of the three-way catalyst 21 detected by the temperature sensor becomes a predetermined temperature or more, it is judged that the three-way catalyst 21 has finished warming up.

When it is judged at step S11 that the three-way catalyst 21 has not finished being warmed up, the routine proceeds to step S12 where the cold start control as shown in FIG. 10 is executed. On the other hand, when it is judged at step S11 that the three-way catalyst 21 has finished being warmed up, the routine proceeds to step S13 where superhigh expansion ratio control such as shown in FIG. 9 is executed.

Note that, in the above embodiment, completion of the warmup of the internal combustion engine is judged based on, for example, whether the temperature of the three-way catalyst 21 has become the activation temperature or more, but, for example, it is also possible to calculate the time required for the three-way catalyst 21 to become the activation temperature or more based on the temperature of the three-way catalyst 21 at the time of engine start or the cumulative intake air amount required for the three-way catalyst 21 to become the activation temperature or more, and judge completion of warmup of the internal combustion engine based on whether that time has elapsed from engine start or whether the cumulative value of the intake air amount from engine start has reached that cumulative intake air amount.

Next, a second embodiment of the present invention will be explained. The configuration of the spark ignition type internal combustion engine of the second embodiment is basically similar to the configuration of the spark ignition type internal combustion engine of the first embodiment. However, in the spark ignition type internal combustion engine of the above first embodiment, at cold start control, the actual compression ratio and mechanical compression ratio (expansion ratio) are controlled without regard to the temperature of the three-way catalyst 21 at the time of engine start, while in the spark ignition type internal combustion engine of the second embodiment, the actual compression ratio and mechanical compression ratio (expansion ratio) are set in accordance with the temperature of the three-way catalyst 21 at the time of engine start.

Figure 12A:
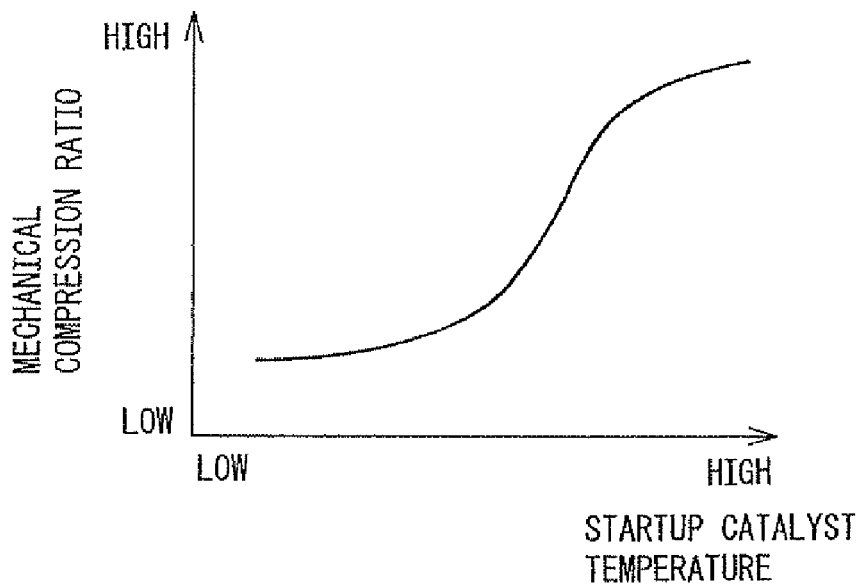
FIG. 12A and FIG. 12B are views showing the temperature of the three-way catalyst and mechanical compression ratio and actual compression ratio before the internal combustion engine finishes warming up.
Figure 12B:
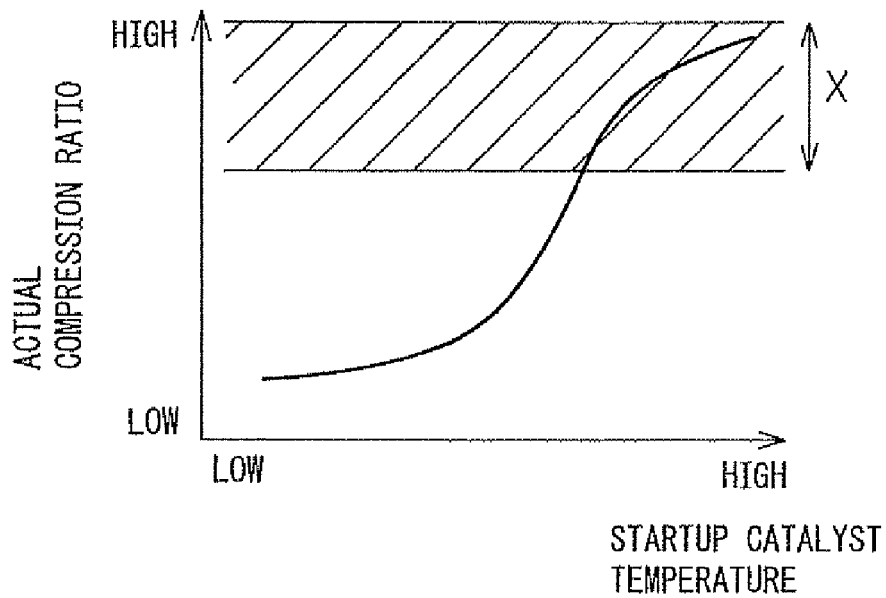

FIG. 12A and FIG. 12B are views showing the relationships between the temperature of the three-way catalyst 21 at the time of engine start and the mechanical compression ratio and between the temperature of the three-way catalyst 21 at the time of engine start and actual compression ratio. As shown in FIG. 12A, in the present embodiment, the lower the temperature of the three-way catalyst 21 at the time of engine start, the lower the mechanical compression ratio at the time of engine start is set. That is, the mechanical compression ratio at the time of engine start is made lower when the temperature of the three-way catalyst 21 is low compared to when it is high.

Further, as shown in FIG. 12B, in the present embodiment, the lower the temperature of the three-way catalyst 21 at the time of engine start, the lower the actual compression ratio at the time the engine start is set. That is, the actual compression ratio at the time of engine start is made lower when the temperature of the three-way catalyst 21 is low compared to when it is high.

In this way, in the present embodiment, the mechanical compression ratio and actual compression ratio at the time of engine start are determined based on the temperature of the three-way catalyst 21 at the time of engine start, and the closing timing of the intake valve 7 is determined based on the thus determined mechanical compression ratio and actual compression ratio. In this case, the closing timing of the intake valve 7 is automatically determined from the mechanical compression ratio and actual compression ratio, so it is difficult to control the amount of air supplied in the combustion chamber 5 by only the closing timing of the intake valve 7. Therefore, in the present embodiment, in addition to the closing timing of the intake valve 7, the throttle valve 17 or other valve provided in the engine intake passage is used to control the amount of air supplied in the combustion chamber 5.

Further, in the present embodiment, a map such as shown in FIG. 12A and FIG. 12B is provided for each engine load. The lower the engine load, the greater the difference in the mechanical compression ratio and actual compression ratio between when the temperature of the three-way catalyst 21 at the time of engine start is high and when the temperature of the three-way catalyst 21 at the time of engine start is low.

FIG. 13 shows the changes of the mechanical compression ratio, expansion ratio, closing timing of the intake valve 7, and intake air amount in accordance with the engine load at the time of engine cold start and is a view similar to FIG. 10. Note that, the solid line in the figures shows the changes in the parameters when executing cold start control in the present embodiment and the temperature of the three-way catalyst 21 at the time of engine start is low, while the dot-chain line in the figure shows the changes when executing cold start control in the present embodiment and the temperature of the three-way catalyst at the time of engine start is relatively high (however, the activation temperature of the three-way catalyst 21 or less). Further, the broken line in the figure shows the changes in the parameters when executing superhigh expansion ratio control performing a superhigh expansion ratio cycle at the time of engine low load operation.

As will be understood from FIG. 13, in the engine low load region, the mechanical compression ratio is made lower when the temperature of the three-way catalyst 21 at the time of engine start is low (solid line) compared to when the temperature of the three-way catalyst 21 is high (dot-chain line). Further, compared with the case of performing superhigh expansion ratio control, the extent of lowering the mechanical compression ratio is made larger the lower the engine load.

In the same way, at the engine low load region, the actual compression ratio is made lower when the temperature of the three-way catalyst 21 at the time of engine start is low (solid line) compared to when the temperature of the three-way catalyst 21 is high (dot-chain line). Further, compared with the case of performing superhigh expansion ratio control, the extent of lowering the actual compression ratio is made larger the lower the engine load.

In the present embodiment, as explained above, a mechanical compression ratio and actual compression ratio in accordance with the engine load are set in accordance with the temperature of the three-way catalyst 21 at the time of engine start and the mechanical compression ratio and actual compression ratio are controlled as set until the internal combustion engine finishes warming up (for example, until the temperature of the three-way catalyst 21 becomes the activation temperature or more). Therefore, for example, when the temperature of the three-way catalyst 21 at the time of engine start is low (solid line), the mechanical compression ratio and actual compression ratio etc. are controlled in accordance with the engine load as shown by the solid line in the figure until the internal combustion engine finishes warming up and the mechanical compression ratio and actual compression ratio etc. are controlled as shown by the broken line in the figure by executing the superhigh expansion ratio control when the internal combustion engine finishes warming up.

According to the present embodiment, in the same way as the case of the above first embodiment, in the case where cold start control is performed, even at the time of engine low load operation, the mechanical compression ratio (expansion ratio) is not made maximum. The mechanical compression ratio is made lower than the case of performing superhigh expansion ratio control. For this reason, the temperature of the exhaust gas will not become low, the three-way catalyst 21 can be rapidly raised in temperature, and the position of the top surface of the piston 4 at compression top dead center is separated by a certain extent from the entrance of the exhaust port 10, so it is possible to keep the concentration of the unburnt HC in the exhaust gas exhausted from the combustion chamber 5 low.

On the other hand, if lowering the mechanical compression ratio (expansion ratio), the heat efficiency falls, and thus deterioration of the fuel consumption efficiency occurs. Here, in the present embodiment, the mechanical compression ratio is set in accordance with the temperature of the three-way catalyst 21 at the time of engine start. For this reason, for example, when the elapsed time from stopping the internal combustion engine to when restarting it is short and other cases where the temperature of the three-way catalyst 21 at the time of engine start is not that low, the extent of lowering the mechanical compression ratio is small. As a result, it is possible to suppress deterioration of the fuel consumption efficiency.

Further, if raising the actual compression ratio, the combustion efficiency rises, so the temperature of the exhaust gas exhausted from the combustion chamber 5 falls. Further, if raising the actual compression ratio, the density of the air-fuel mixture in the combustion chamber 5 when the piston 4 is at compression top dead center rises, so the amount of fuel in the quench region (quench zone) increases and as a result the concentration of unburnt HC in the exhaust gas is increased. According to the present embodiment, in the case where cold start control is performed, compared with the case where superhigh expansion ratio control is performed, the actual compression ratio is made low, so it is possible to raise the temperature of the exhaust gas exhausted from the combustion chamber 5 and possible to keep the concentration of unburnt HC in the exhaust gas low. In particular, according to the present embodiment, the actual compression ratio is set in accordance with the temperature of the three-way catalyst 21 at the time of engine start, so when the temperature of the three-way catalyst 21 at the time of engine start is not that low, it is possible to reduce the extent of reduction of the actual compression ratio. As a result, it is possible to suppress deterioration of the fuel consumption efficiency.

Due to the above, according to the present embodiment, it is possible to rapidly raise the temperature of the three-way catalyst 21 and keep the concentration of the unburnt HC in the exhaust gas exhausted from the combustion chamber 5 low while suppressing deterioration of the fuel consumption efficiency.

Note that, in the above embodiment, both the mechanical compression ratio and actual compression ratio are made lower as the temperature of the three-way catalyst 21 at the time of engine start becomes lower. However, it is also possible to lower only the mechanical compression ratio and maintain the actual compression ratio in a relatively high constant range (for example, range X in FIG. 12B) without changing it that much as the temperature of the three-way catalyst 21 becomes lower. Due to this, compared with the above embodiment, the rise in temperature of the three-way catalyst 21 is delayed somewhat and the concentration of unburnt HC in the exhaust gas becomes somewhat higher, but it becomes possible to make the fuel consumption efficiency a high one.

Further, in the above embodiment, the mechanical compression ratio and actual compression ratio are set in accordance with the temperature of the three-way catalyst 21 at the time of engine start and the mechanical compression ratio and actual compression ratio are controlled as set until the internal combustion engine finishes warming up. However, it is also possible to change the settings of the mechanical compression ratio and actual compression ratio along with the rise of the temperature of the three-way catalyst 21 after engine start. In this case, for example, when the temperature of the three-way catalyst 21 at the time of engine start is low, the mechanical compression ratio and actual compression ratio etc. are controlled as shown by the solid line in FIG. 13, after this, the mechanical compression ratio and actual compression ratio etc. are, for example, controlled as shown by the one-chain line in FIG. 13 along with the rise of the temperature of the three-way catalyst 21, and after the internal combustion engine finishes warming up, superhigh expansion ratio control is executed and the mechanical compression ratio and actual compression ratio etc. are controlled as shown by the broken line in the figure.

Furthermore, in the present embodiment, a map such as shown in FIG. 12A and FIG. 125 is prepared for each engine load. However, for example, it is also possible to find the relationships between the startup catalyst temperature and mechanical compression ratio correction amount and between the startup catalyst temperature and actual compression ratio correction amount in advance as a map and correct the mechanical compression ratio and actual compression ratio in accordance with the engine load found without regard to the startup catalyst temperature by the mechanical compression ratio correction amount and actual compression ratio correction amount calculated using this map. Alternatively, it is possible to find the relationship between the startup catalyst temperature and the mechanical compression ratio correction coefficient and actual compression ratio correction coefficient in advance as a map and multiply the mechanical compression ratio and actual compression ratio in accordance with the engine load found without regard to the startup catalyst temperature with the mechanical compression ratio correction coefficient and actual compression ratio correction coefficient calculated using this map.

Figure 14:
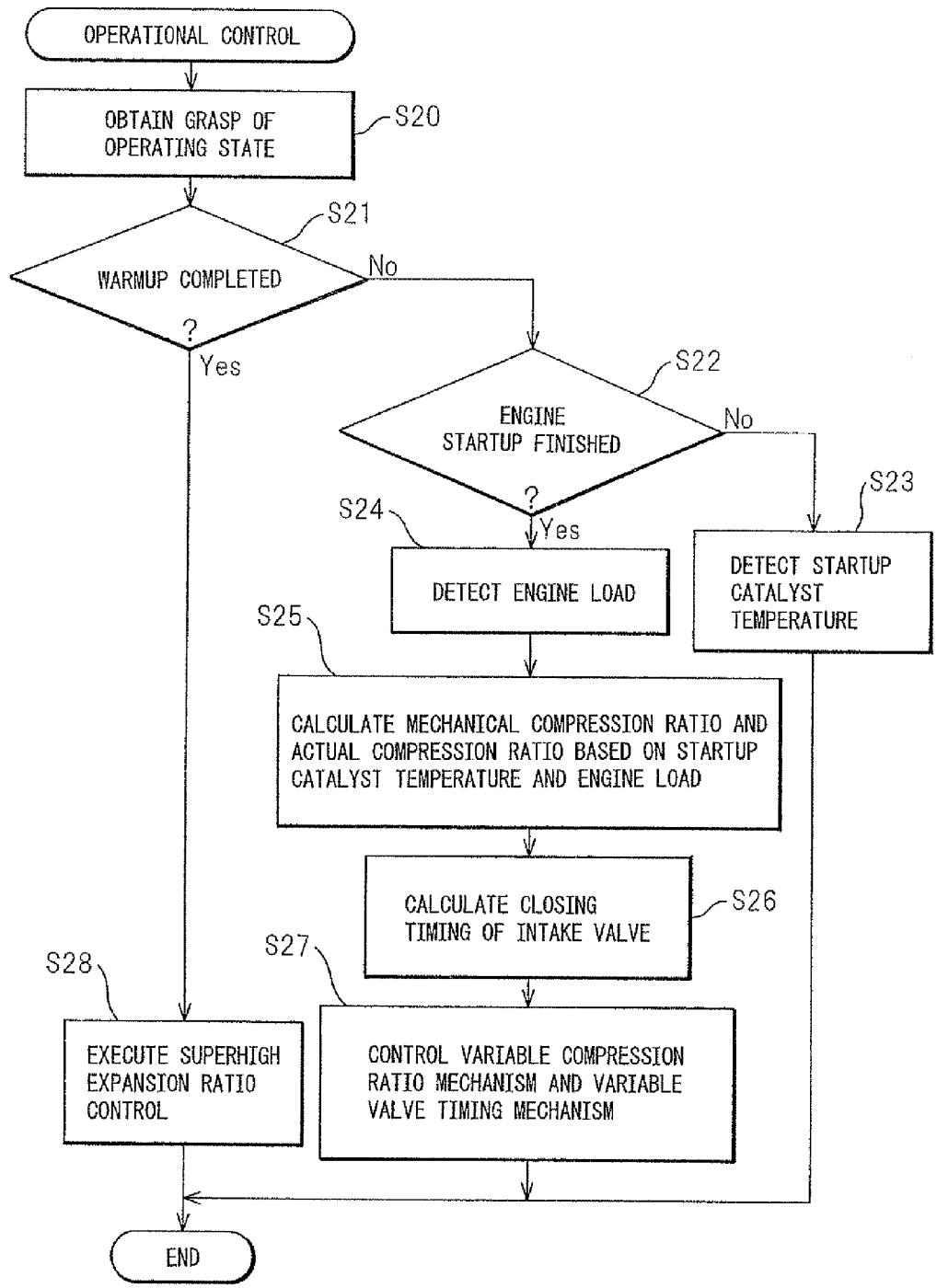
FIG. 14 is a flowchart showing a control routine of operational control of an internal combustion engine of a second embodiment.

FIG. 14 is a flowchart showing the control routine of operational control of the internal combustion engine in a second embodiment. The illustrated control routine is performed by interruption every constant time interval.

As shown in FIG. 14, first, at step S20, in the same way as step S11 shown in FIG. 11, the operating state of the internal combustion engine is detected. Next, at step S21, it is judged if the internal combustion engine, in particular, the three-way catalyst 21, has finished warming up. At the time of engine cold start, it is judged that the internal combustion engine has not finished warming up, then the routine proceeds to step S22. At step S22, it is judged that the internal combustion engine has already been started. Before the internal combustion engine is started, the routine proceeds to step S23 where the temperature of the three-way catalyst 21 is detected. The temperature of the three-way catalyst 21 is detected right before engine start, so the temperature of the three-way catalyst 21 at the time of engine start is detected.

After this, when the internal combustion engine is started, at the next control routine, at step S22, it is judged that the internal combustion engine has already started, then the routine proceeds to step S24. At step S24, the engine load is detected. Next, at step S25, the target mechanical compression ratio and target actual compression ratio is calculated based on the temperature of the three-way catalyst 21 at the time of engine start detected at step S23 and the engine load detected at step S24 by using the map shown in FIG. 12A and FIG. 12B. At step S26, the target closing timing of the intake valve 7 is calculated based on the target mechanical compression ratio and target actual compression ratio calculated at step S25. Next, at step S27, the variable compression ratio mechanism A is controlled so that the mechanical compression ratio becomes the target mechanical compression ratio calculated at step S25 and the variable valve timing mechanism B is controlled so that the closing timing of the intake valve 7 becomes the target closing timing calculated at step S26.

If the internal combustion engine finishes warming up after this, at the next control routine, at step S21, it is judged that the internal combustion engine has finished warming up, then the routine proceeds to step S28 where superhigh expansion ratio control such as shown in FIG. 9 is executed.

Next, a third embodiment of the present invention will be explained. The constitution of the spark ignition type internal combustion engine of the third embodiment is basically similar to the configuration of the spark ignition type internal combustion engine of the second embodiment. However, in the spark ignition type internal combustion engine of the above second embodiment, in cold start control, the mechanical compression ratio and actual compression ratio are set in accordance with the temperature of the three-way catalyst at the time of engine start, while in the spark ignition type internal combustion engine of the third embodiment, the mechanical compression ratio and actual compression ratio are set in accordance with the temperature of the engine cooling water at the time of engine start.

Figure 15A:
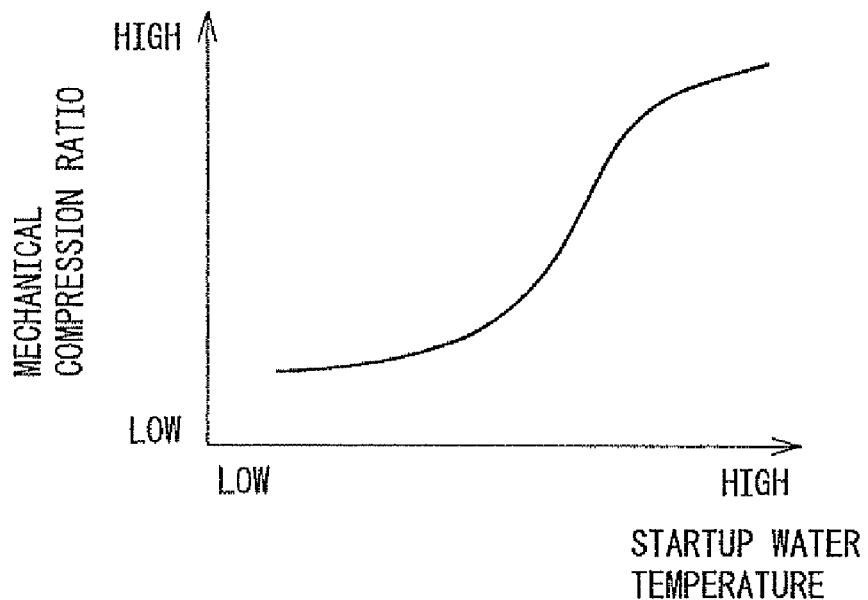
FIG. 15A and FIG. 15B are views showing the relationship between the temperature of the engine cooling water and mechanical compression ratio and actual compression ratio before the internal combustion engine finishes warming up.
Figure 15B:
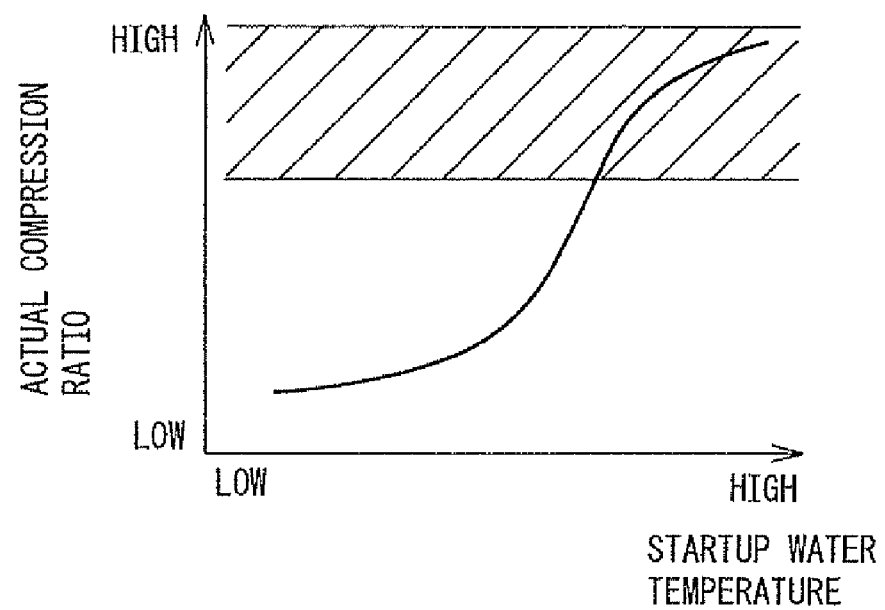

FIG. 15A and FIG. 15B are views showing the relationships between the temperature of the engine cooling water at the time of engine start and the mechanical compression ratio and between the temperature of the engine cooling water at the time of engine start and actual compression ratio. As shown in FIG. 15A, in the present embodiment, the lower the temperature of the engine cooling water at the time of engine start, the lower the mechanical compression ratio at the time of engine start is set. That is, the mechanical compression ratio at the time of engine start is made lower when the temperature of the engine cooling water is low compared to when it is high.

Further, as shown in FIG. 15B, in the present embodiment, the lower the temperature of the engine cooling water at the time of engine start, the lower the actual compression ratio at the time of engine start is set. That is, the actual compression ratio at the time of engine start is made lower in the case where the temperature of the engine cooling water at the time of engine start is low compared to the case where it is high.

Further, in the present embodiment, in the same way as the above second embodiment, in addition to the closing timing of the intake valve 7, a throttle valve 17 or other valve provided in the engine intake passage is used to control the amount of air supplied in the combustion chamber 5. Furthermore, the present embodiment has a map such as shown in FIG. 15A and FIG. 15B for each engine load. The lower the engine load, the greater the difference in the mechanical compression ratio and actual compression ratio between when the temperature of the engine cooling water at the time of engine start is high and when the temperature of the engine cooling water at the time of engine start is low.

In this regard, in general, at the time of engine cold start, the combustion of the air-fuel mixture in the combustion chamber 5 deteriorates, so the unburnt HC in the exhaust gas exhausted from the combustion chamber 5 is increased. In particular, the concentration of the unburnt HC in the exhaust gas exhausted from the combustion chamber 5 becomes higher, the lower the wall temperature of the cylinder head 2 around the combustion chamber 5 or the wall temperature of the intake port 8, therefore, the lower the temperature of the engine cooling water.

As opposed to this, as explained above, if setting the mechanical compression ratio and actual compression ratio low, it is possible to lower the concentration of the unburnt HC in the exhaust gas exhausted from the combustion chamber 5. Here, in the present embodiment, the lower the temperature of the engine cooling water, the lower the mechanical compression ratio and actual compression ratio are set. For this reason, according to the present embodiment, regardless of the temperature of the engine cooling water, the concentration of the unburnt HC in the exhaust gas exhausted from the combustion chamber 5 can be kept low. Further, in the present embodiment, the mechanical compression ratio and actual compression ratio are changed in accordance with the temperature of the engine cooling water, so in the same way as the above embodiment, it is possible to suppress deterioration of the fuel consumption efficiency.

Note that, it is also possible to combine the above second embodiment and third embodiment and control the mechanical compression ratio and actual compression ratio to the lower of the mechanical compression ratio and actual compression ratio calculated based on the temperature of the three-way catalyst 21 and the mechanical compression ratio and actual compression ratio calculated based on the temperature of the engine cooling water.

Next, a fourth embodiment of the present invention will be explained. The constitution of the spark ignition type internal combustion engine of the fourth embodiment is basically similar to the constitution of the spark ignition type internal combustion engine of the third embodiment. However, in the spark ignition type internal combustion engine of the above third embodiment, in cold start control, the lower the temperature of the engine cooling water at the time of engine start, the lower the actual compression ratio is set, while in the spark ignition type internal combustion engine of the fourth embodiment, in the region where the temperature of the engine cooling water at the time of engine start is lower than a certain constant temperature (hereinafter referred to as the "reference temperature"), the lower the temperature of the engine cooling water, the higher the actual compression ratio is set.

Figure 16A:
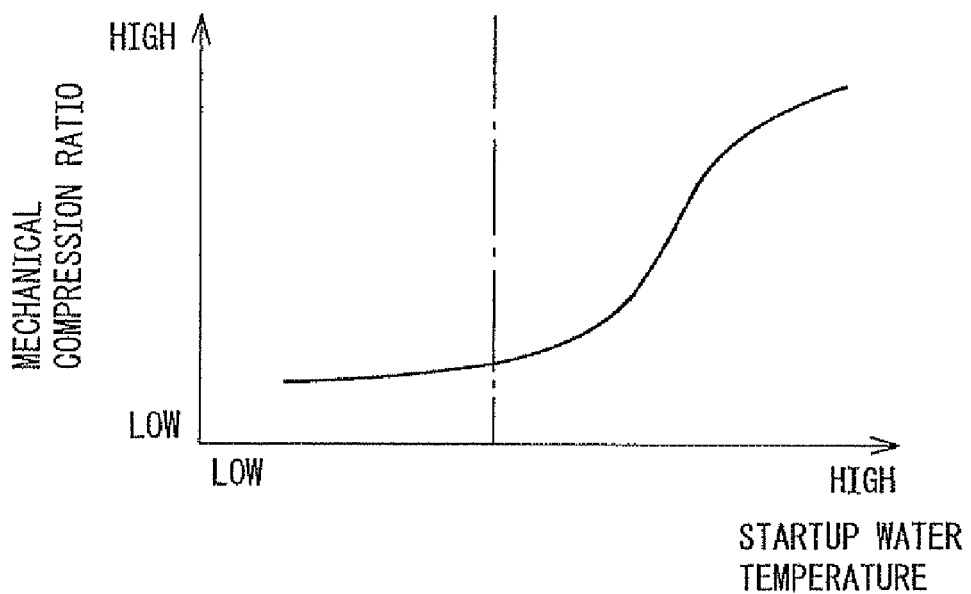
FIG. 16A and FIG. 16B are views showing the relationship between the temperature of the engine cooling water and mechanical compression ratio and actual compression ratio before the internal combustion engine finishes warming up.
Figure 16B:
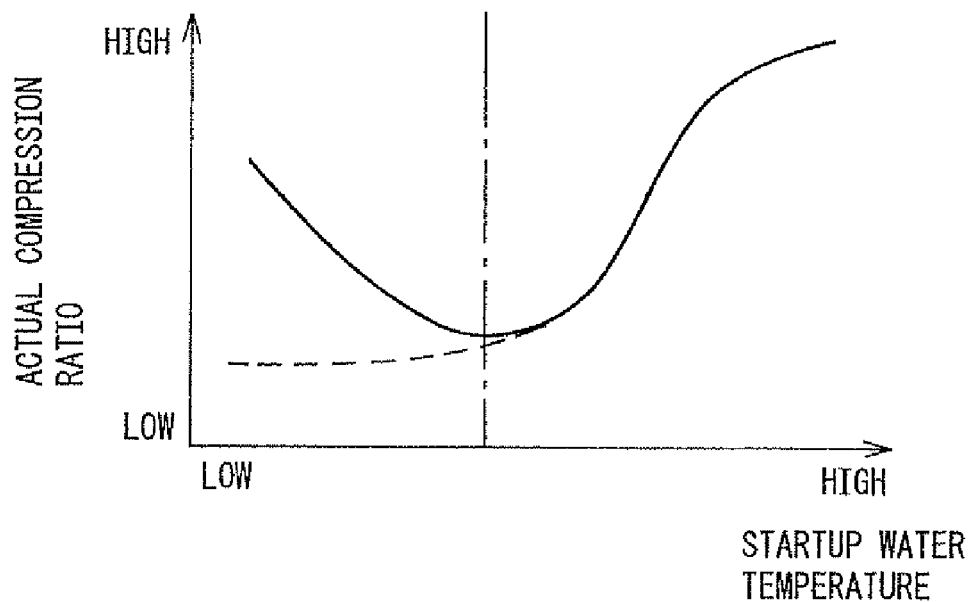

FIG. 16A and FIG. 16B are views showing the relationships between the temperature of the engine cooling water at the time of engine start and the mechanical compression ratio and between the temperature of the engine cooling water at the time of engine start and actual compression ratio. As shown in FIG. 16A, in the present embodiment, in the same way as the third embodiment, the lower the temperature of the engine cooling water at the time of engine start, the lower the mechanical compression ratio at the time of engine start is set. That is, the mechanical compression ratio at the time of engine start is made lower when the temperature of the engine cooling water at the time of engine start is low compared with when it is high.

Further, as shown by the solid line in FIG. 16B, in the present embodiment, in the temperature region where the temperature of the engine cooling water is higher than a reference temperature (hereinafter referred to as the "high temperature side region"), the lower the temperature of the engine cooling water at the time of engine start, the lower the actual compression ratio at the time of engine start is set. That is, in the high temperature side region, the actual compression ratio at the time of engine start is made lower when the temperature of the engine cooling water is low compared with when it is high.

On the other hand, in the temperature region where the temperature of the engine cooling water is the reference temperature or less (hereinafter referred to as the "low temperature side region"), the lower the temperature of the engine cooling water at the time of engine start, the higher the actual compression ratio at the time of engine start is set. That is, at the low temperature side region, the actual compression ratio at the time of engine start is made larger when the temperature of the engine cooling water is low compared with when it is high.

In this regard, in general, if lowering the actual compression ratio, the temperature of the air-fuel mixture compressed by the piston 4 up to near compression top dead center (compression end temperature) falls. If after the internal combustion engine finishes warming up, even if lowering the actual compression ratio and lowering the compression end temperature, the ignitability of the air-fuel mixture is not affected much at all. However, before the internal combustion engine finishes warming up, that is, at the time of engine cold start, if the compression end temperature falls, the ignitability of the air-fuel mixture falls and as a result the state of combustion of the air-fuel mixture in the combustion chamber 5 will be deteriorated. This trend is remarkable when the temperature of the engine cooling water is at a certain constant temperature (for example, ordinary temperature: 20° C.±10° C.) or less.

Here, in the present embodiment, at the low temperature side region, the lower the temperature of the engine cooling water at the time of engine start, the higher the actual compression ratio at the time of engine start is set. For this reason, the lower the temperature of the engine cooling water at the time of engine start, the higher the compression end temperature and the more suppressed the deterioration of the state of combustion of the air-fuel mixture in the combustion chamber 5.

Note that, the reference temperature dividing the low temperature side region and the high temperature side region is made a certain constant temperature where the deterioration of the air-fuel mixture in the combustion chamber 5 would become remarkable if the temperature falls more from this (for example, ordinary temperature: 20° C.±10° C.)

Further, in the present embodiment, after a constant time has elapsed after engine start, as shown by the broken line in FIG. 16B, even at the low temperature side region, the lower the temperature of the engine cooling water, the lower the actual compression ratio is set. Therefore, after a certain extent of time after engine start elapses, in all temperature regions, the lower the temperature of the engine cooling water, the lower the actual compression ratio is set.

In this regard, at the time of engine cold start, the fall in the ignitability of the air-fuel mixture is temporary. It is possible to obtain a sufficient ignitability after a certain extent of time has elapsed from after engine start. For this reason, at the time of engine start, it is necessary to raise the compression end temperature to improve the ignitability only until the certain amount of time after engine start elapses. Conversely, if leaving the actual compression ratio high for raising the compression end temperature over a time longer than this, warmup of the three-way catalyst 21 is delayed and the concentration of the unburnt HC in the exhaust gas exhausted from the combustion chamber 5 is increased.

According to the present embodiment, after the elapse of a constant time after engine start, at the low temperature side region, the increase in the actual compression ratio is ended and the actual compression ratio is controlled in accordance with the temperature of the engine cooling water as shown in FIG. 15B. Due to this, it is possible to maintain the ignitability of the air-fuel mixture at the time of engine cold start high and realize faster warmup of the three-way catalyst 21 and a reduction in the concentration of unburnt HC in the exhaust gas.

Note that, the above constant time is the time after engine start to when sufficiently ignitability is obtained. The lower the temperature of the engine cooling water at the time of engine start, the longer the time is made. Alternatively, the above constant time may be made the time until the first explosion in the combustion chamber 5 after engine start or the time until the engine speed becomes a constant speed (for example, 400 rpm) or more after engine start.

Note that, in the above embodiment, at the low temperature side region, the lower the temperature of the engine cooling water at the time of engine start, the lower the mechanical compression ratio at the time of engine start is set. However, for example, as shown by the solid line in FIG. 17A, it is also possible that at the low temperature side region, the lower the temperature of the engine cooling water at the time of engine start, the higher the mechanical compression ratio at the time of engine start is set.

Figure 17A:
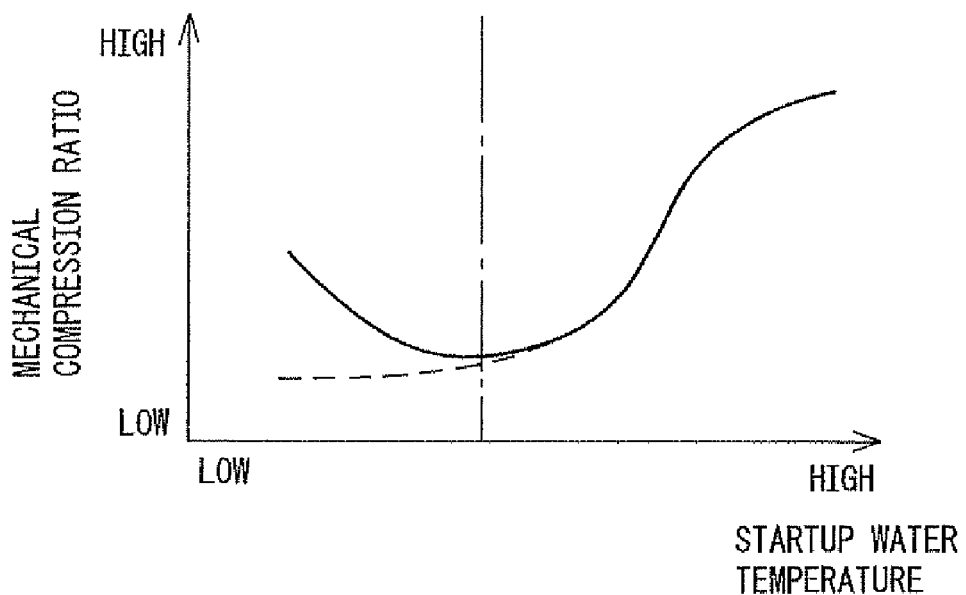
FIG. 17A and FIG. 17B are views showing the relationship between the temperature of the engine cooling water and mechanical compression ratio and actual compression ratio before the internal combustion engine finishes warming up.

Further, in this case, it is also possible that after the elapse of a constant time after engine start, as shown by the broken line in FIG. 17A, even in the low temperature side region, the lower the temperature of the engine cooling water, the lower the actual compression ratio is set.

Figure 17B:
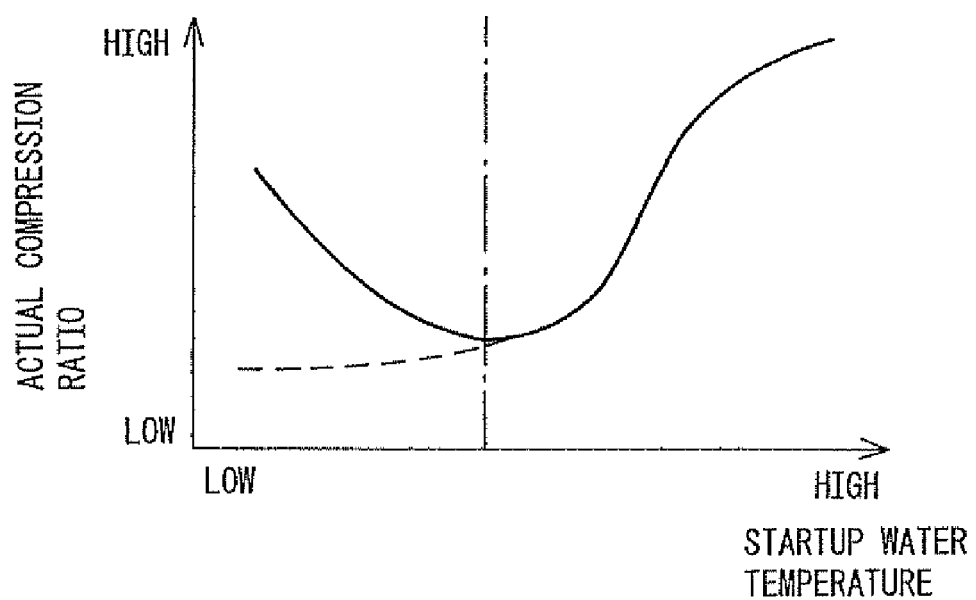
Figure 18:
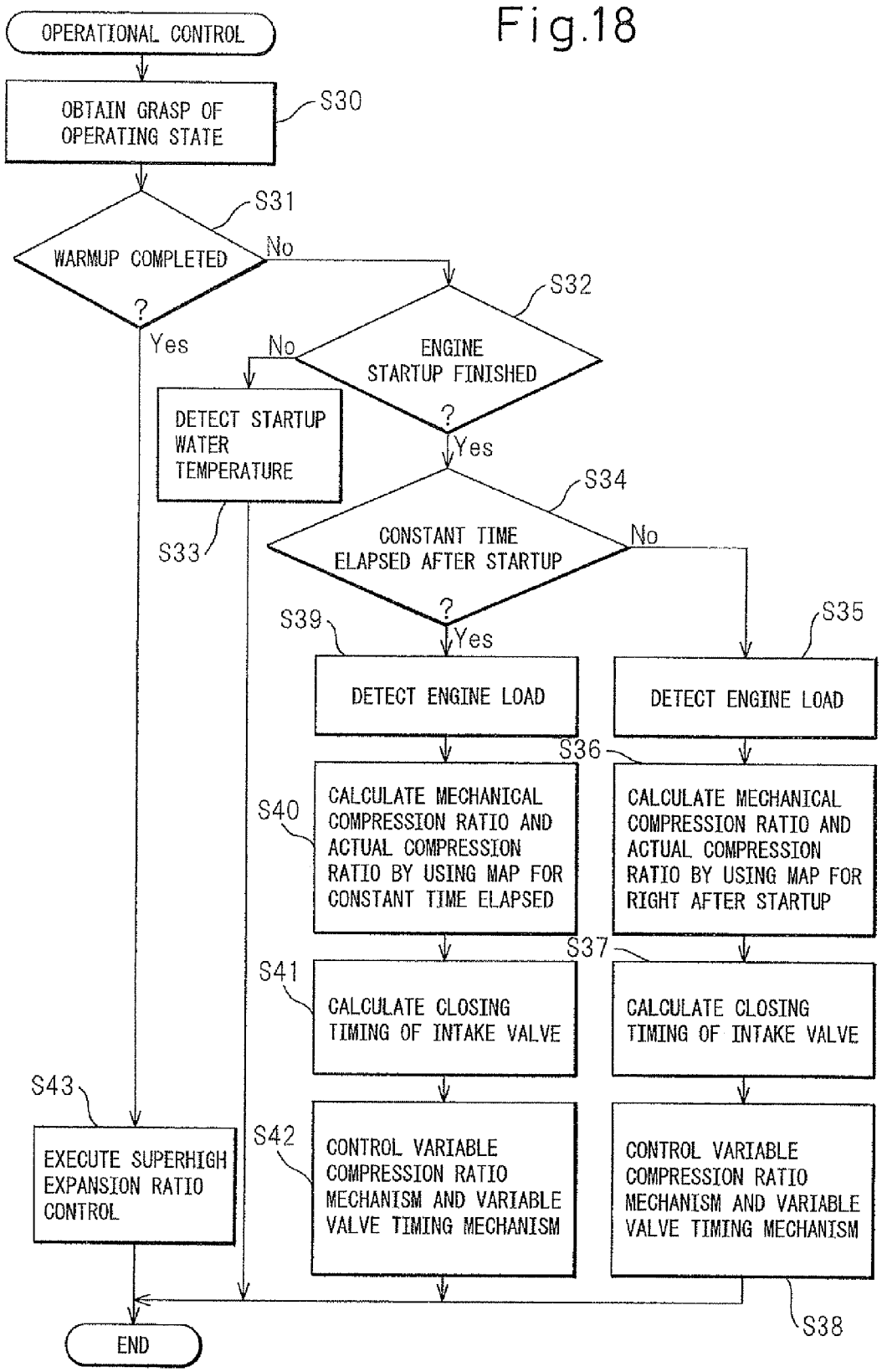
FIG. 18 is a flowchart showing a control routine of operational control of an internal combustion engine of a fourth embodiment.

FIG. 18 is a flowchart showing the control routine in operational control of an internal combustion engine in a fourth embodiment. The illustrated control routine is performed by interruption every certain time interval. Steps S30 to S33 are similar to steps S20 to S23 shown in FIG. 14, so explanations will be omitted. When it is judged at step S32 that the internal combustion engine has already started up, the routine proceeds to step S34. At step S34, it is judged if a constant time has elapsed after engine start. Right after engine start, it is judged that a constant time has not elapsed and the routine proceeds to step S35. At step S35, the engine load is detected. Next at step S36, based on the temperature of the engine cooling water at the time of engine start detected at step S33 and the engine load detected at step S35, the mechanical compression ratio and actual compression ratio are calculated by using the map shown by the solid line in FIG. 17A and FIG. 17B (map for right after startup). At step S37, based on the target mechanical compression ratio and target actual compression ratio calculated at step S36, the target closing timing of the intake valve 7 is calculated. Next, at step S38, the variable compression ratio mechanism A is controlled so that the mechanical compression ratio becomes the target mechanical compression ratio calculated at step S36 and the variable valve timing mechanism B is controlled so that the closing timing of the intake valve 7 becomes the target closing timing calculated at step S37.

After this, when a constant time elapses after engine start, at the next control routine, at step S34, it is judged that a constant time has elapsed after engine start and the routine proceeds to step S39. At step S39, the engine load is detected. Next, at step S40, by using the map shown by the broken line in FIG. 17A and FIG. 17B (map after elapse of predetermined time) the mechanical compression ratio and actual compression ratio are calculated based on the temperature of the engine cooling water at the time of engine start detected at step S33 and the engine load detected at step S39. Next, at step S41, in the same way as step S37, the target closing timing of the intake valve is calculated, while at step S42, in the same way as step S38, the variable compression ratio mechanism A and variable valve timing mechanism B are controlled.

Further, when the internal combustion engine finishes warming up, at the next control routine, at step S31, it is judged that the internal combustion engine finished warming up and the routine proceeds to step S43, where the superhigh expansion ratio control such as shown in FIG. 9 is performed.

Next, a fifth embodiment of the present invention will be explained. The configuration of the spark ignition type internal combustion engine of the fifth embodiment is basically similar to the spark ignition type internal combustion engine of the third embodiment and fourth embodiment. However, in the spark ignition type internal combustion engine of the above third embodiment and fourth embodiment, the mechanical compression ratio and actual compression ratio are set without considering the fuel properties, while in the spark ignition type internal combustion engine of the fifth embodiment, the mechanical compression ratio and actual compression ratio are set in consideration of the fuel properties.

Figure 19A:
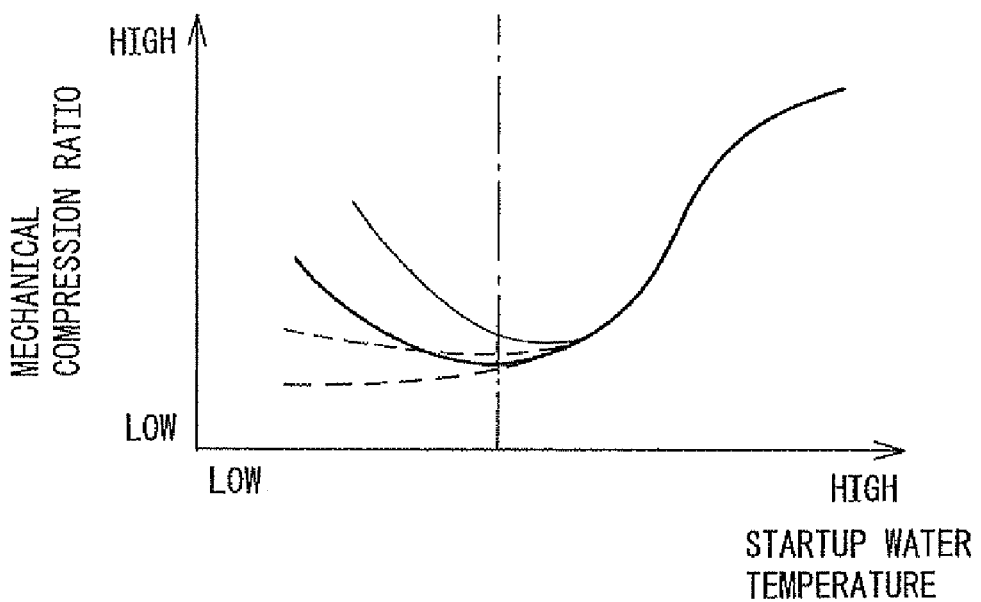
FIG. 19A and FIG. 19B are views showing the relationship of the temperature of the engine cooling water and mechanical compression ratio and actual compression ratio before the internal combustion engine finishes warming up.
Figure 19B:
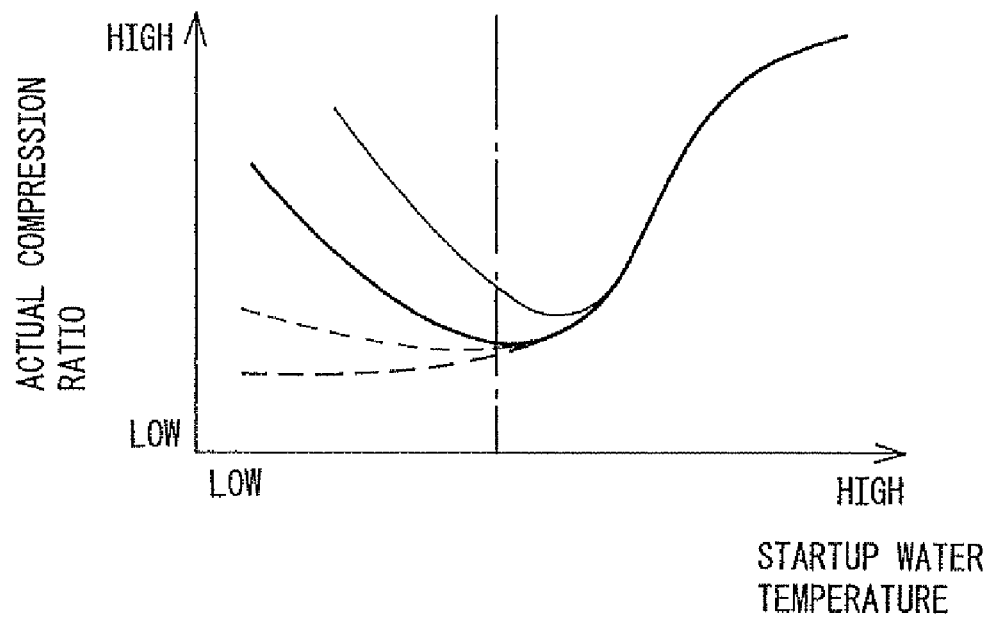

FIG. 19A and FIG. 19B are views similar to FIG. 17A and FIG. 17B, showing the relationships between the temperature of the engine cooling water at the time of engine start and the mechanical compression ratio and between the temperature of the engine cooling water at the time of engine start and actual compression ratio. The bold lines in the figures show the relationship in the case where the concentration of the heavy fuel in the fuel is low (that is, when the concentration of light fuel in the fuel is high), while the fine lines in the figures show the relationship in the case where the concentration of the heavy fuel in the fuel is high. As shown by the solid lines in FIG. 19A and FIG. 19B, in the present embodiment, in the same way as the case shown in FIG. 17A and FIG. 17B, at the high temperature side region, the lower the temperature of the engine cooling water at the time of engine start, the lower the mechanical compression ratio and actual compression ratio at the time of engine start are set. On the other hand, at the low temperature side region, the lower the temperature of the engine cooling water at the time of engine start, the higher the mechanical compression ratio at the time of engine start and actual compression ratio are set. Further, as shown by the broken lines in FIG. 19A and FIG. 19B, after the elapse of a constant time after engine start, even at the low temperature side region, the lower the temperature of the engine cooling water, the lower the mechanical compression ratio and actual compression ratio are set.

In addition, in the present embodiment, in particular in the low temperature side region, when the heavy fuel concentration in the fuel is high (fine lines in figure), compared with when the heavy fuel concentration in the fuel is low (bold lines in figure), the mechanical compression ratio and actual compression ratio are made higher. More specifically, in the present embodiment, the higher the heavy fuel concentration in the fuel, the higher the mechanical compression ratio and actual compression ratio are made.

In this regard, heavy fuel has a lower vaporization rate compared with light fuel when the internal combustion engine is cold. For this reason, the higher the concentration of heavy fuel in the fuel, the more difficult the vaporization of the fuel when the internal combustion engine is cold and as a result the worse the combustion of the air-fuel mixture in the combustion chamber 5.

Here, in the present embodiment, when the internal combustion engine is cold, the higher the concentration of the heavy fuel in the fuel, the higher the actual compression ratio is set. As explained above, if the actual compression ratio is made high, the compression end temperature rises and as a result the fuel in the air-fuel mixture easily vaporizes. Therefore, according to the present embodiment, even when using fuel with a high concentration of heavy fuel, at the time of engine cold start, an air-fuel mixture can be burned relatively well.

On the other hand, as shown in FIG. 19B, even when using fuel with a high concentration of heavy fuel, at the high temperature side region, the fuel relatively easily vaporizes. Therefore, in the present embodiment, at the high temperature side region, even when the heavy fuel concentration is high (fine lines in figure), the actual compression ratio is set in the same way as when the heavy fuel concentration is low (bold lines in figure). Due to this, even if using heavy fuel, in the high temperature side region where fuel easily vaporizes, it is possible to realize a drop in the concentration of unburnt HC in the exhaust gas. Therefore, according to the present embodiment, it is possible to facilitate vaporization of the fuel and lower the concentration of unburnt HC in the exhaust gas.

Note that, changes in the vaporization rate of the fuel as a whole in accordance with properties of the fuel can occur not only when the fuel contains heavy fuel, but also for example when the fuel contains ethanol or methanol. For example, in the case where the fuel contains ethanol, the higher the concentration of ethanol in the fuel, the worse the vaporization rate of the fuel as a whole. For this reason, in this case, at the time of engine cold start, the higher the concentration of ethanol in the fuel, the higher the actual compression ratio is made in particular at the low temperature side region.

Therefore, if expressing these all together, according to the present embodiment, the lower the vaporization rate of the fuel injected from the fuel injector 13 at the time of engine cold start (for example, the lower the concentration of the heavy fuel, ethanol, methanol, etc. in the fuel), the higher the actual compression ratio is made at the time of engine cold start, in particular the low temperature side region.

Note that, the present invention has been explained in detail based on specific embodiments, but a person skilled in the art could make various changes, modifications, etc. without departing from the claims and idea of the present invention.

The invention claimed is:

1. A spark ignition type internal combustion engine provided with a variable compression ratio mechanism able to change a mechanical compression ratio and a variable valve timing mechanism able to control a closing timing of an intake valve, a temperature sensor for detecting a temperature of an engine cooling water and a controller for controlling the variable compression ratio mechanism and the variable valve timing mechanism, an amount of intake air supplied in a combustion chamber being mainly controlled by changing a closing timing of the intake valve, and the mechanical compression ratio being made higher at a time of engine low load operation compared with a time of engine high load operation,
wherein the controller makes the mechanical compression ratio at the time of engine low load operation before the internal combustion engine finishes warming up a compression ratio lower than the mechanical compression ratio at the time of engine low load operation after the internal combustion engine finishes warming up, and
wherein before the internal combustion engine finishes warming up, in a temperature region where the temperature of the engine cooling water detected by the temperature sensor is higher than a reference temperature, the controller makes the actual compression ratio lower when the temperature of the engine cooling water is low compared with when it is high, and in the temperature region where the temperature of the engine cooling water is lower than the reference temperature, the controller makes the actual compression ratio higher when the temperature of the engine cooling water is low compared with when it is high.

2. A spark ignition type internal combustion engine as set forth in claim 1, wherein at the time of engine low load operation, the controller makes the mechanical compression ratio a maximum mechanical compression ratio and, before the internal combustion engine finishes warming up, even at the time of engine low load operation, the controller makes the mechanical compression ratio a compression ratio lower than the maximum mechanical compression ratio.

3. A spark ignition type internal combustion engine as set forth in claim 1, wherein at the time of engine low load operation, the controller makes an expansion ratio 20 and, before the internal combustion engine finishes warming up, even at the time of engine low load operation, the controller sets the mechanical compression ratio so that the expansion ratio becomes less than 20.

4. A spark ignition type internal combustion engine as set forth in claim 1, wherein the closing timing of the intake valve is moved in a direction away from intake bottom dead center until a limit closing timing able to control the amount of intake air supplied in the combustion chamber as the engine load becomes lower, and
wherein before the internal combustion engine finishes warming up, even at the time of engine low load operation, the closing timing of the intake valve is only moved to the closing timing at the intake bottom dead center side from the above limit closing timing.

5. A spark ignition type internal combustion engine as set forth in claim 1, wherein before the internal combustion engine finishes warming up, the mechanical compression ratio is made lower when the temperature of an exhaust purification catalyst provided in the engine exhaust passage is low compared with when it is high.

6. A spark ignition type internal combustion engine as set forth in claim 5, wherein before the internal combustion engine finishes warming up, the mechanical compression ratio is made higher the higher the temperature of the exhaust purification catalyst.

7. A spark ignition type internal combustion engine as set forth in claim 5, wherein the mechanical compression ratio is set based on the temperature of the exhaust purification catalyst at the time of engine start so that the mechanical compression ratio becomes lower when the temperature of the exhaust purification catalyst is low compared with when it is high, and the mechanical compression ratio is maintained at the mechanical compression ratio set based on the temperature of the exhaust purification catalyst at the time of engine start until the internal combustion engine finishes warming up.

8. A spark ignition type internal combustion engine as set forth in claim 1, wherein before the internal combustion engine finishes warming up, the mechanical compression ratio is made lower when the temperature of the engine cooling water is low compared with when it is high.

9. A spark ignition type internal combustion engine as set forth in claim 1, wherein before the internal combustion engine finishes warming up, the controller makes the mechanical compression ratio lower when the temperature of the engine cooling water is low compared with when it is high.

10. A spark ignition type internal combustion engine as set forth in claim 1, wherein before the internal combustion engine finishes warming up, in the temperature region where the temperature of the engine cooling water is higher than a reference temperature, the controller makes the actual compression ratio lower when the temperature of the engine cooling water is low compared with when it is high, and in the temperature region where the temperature of the engine cooling water is lower than the reference temperature, the actual compression ratio is made higher when the temperature of the engine cooling water is low compared with when it is high.

11. A spark ignition type internal combustion engine as set forth in claim 1, wherein after a constant time elapses after the startup of the internal combustion engine, even in the temperature region where the temperature of the engine cooling water is lower than a reference temperature, the controller makes the actual compression ratio lower when the temperature of the engine cooling water is low compared with when it is high.

12. A spark ignition type internal combustion engine as set forth in claim 11, wherein the constant time is made longer the lower the temperature of the engine cooling water at the time of engine start.

13. A spark ignition type internal combustion engine as set forth in claim 1, wherein before the internal combustion engine finishes warming up, the controller makes the actual compression ratio higher when a vaporization rate of fuel supplied to the internal combustion engine is low compared with when it was high.

* * * * *